Figure 1:
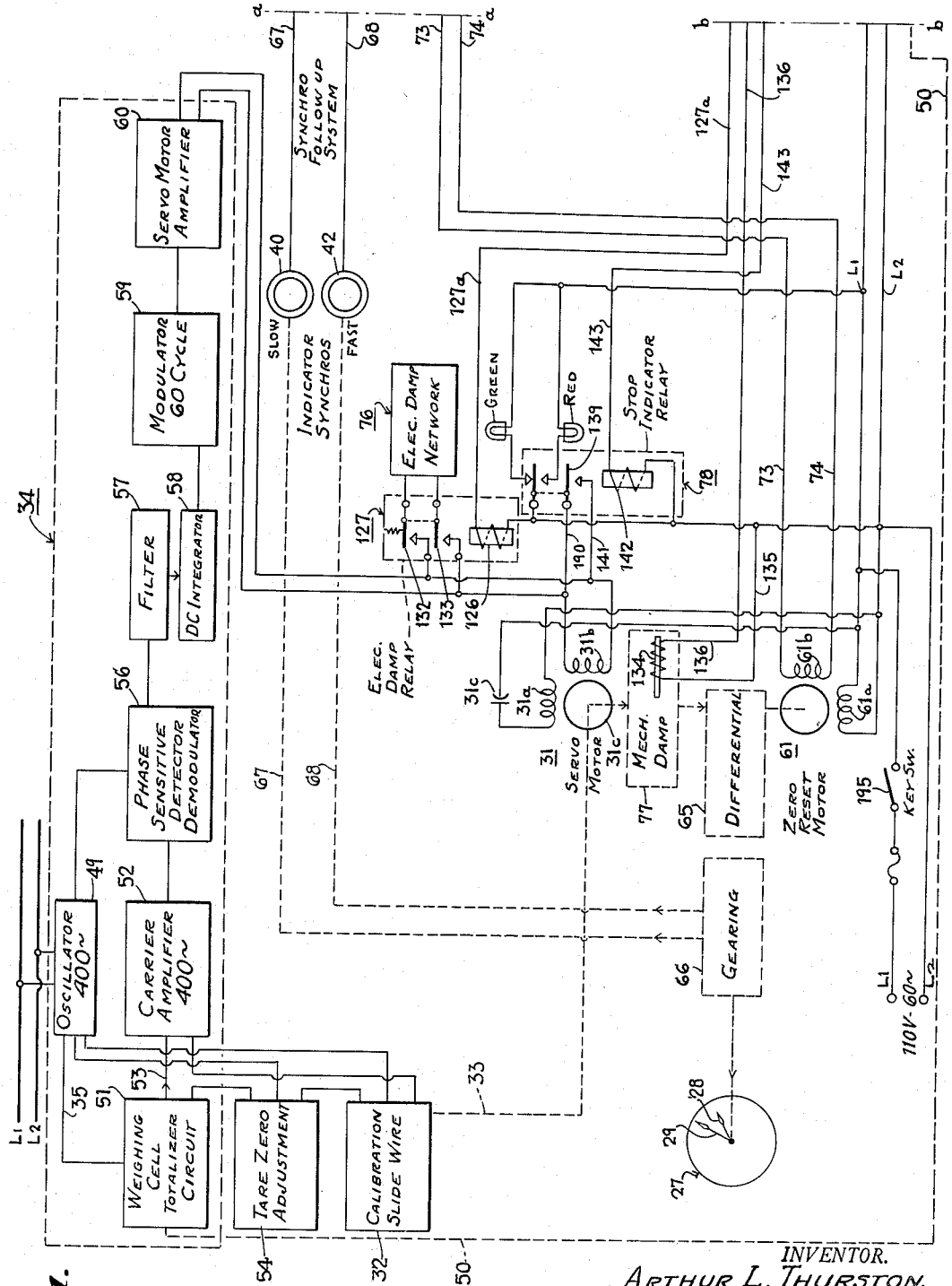

Nov. 15, 1955

A. L. THURSTON 2,723,844

RAILWAY VEHICLE SCALE

Filed May 11, 1953

7 Sheets-Sheet 1

INVENTOR.
ARTHUR L. THURSTON.
BY Ward, Crosby & Neal
his ATTORNEYS.

Nov. 15, 1955  A. L. THURSTON  2,723,844
RAILWAY VEHICLE SCALE
Filed May 11, 1953  7 Sheets-Sheet 2
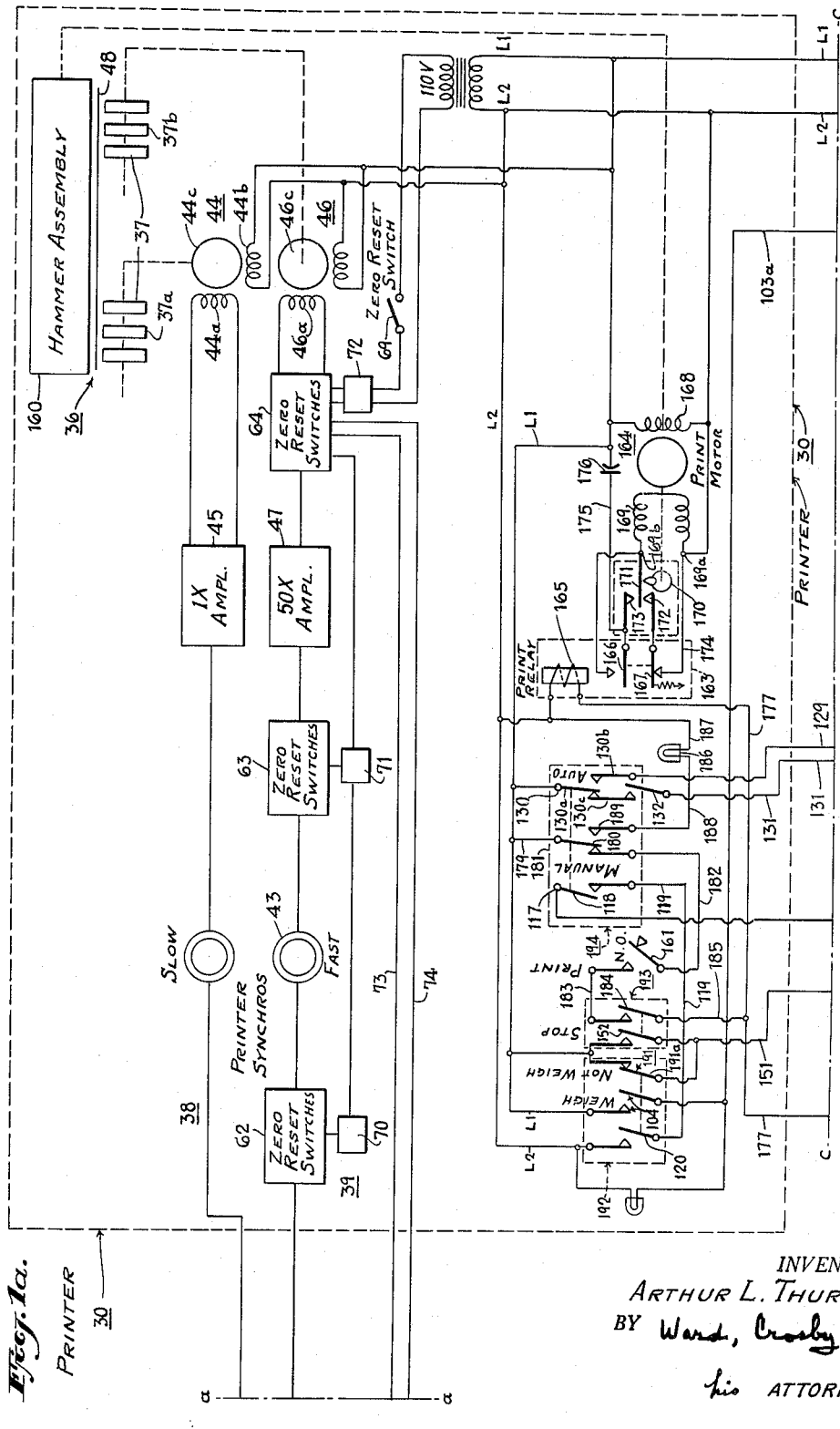
INVENTOR.
ARTHUR L. THURSTON
BY Ward, Crosby & Neal
his ATTORNEYS.

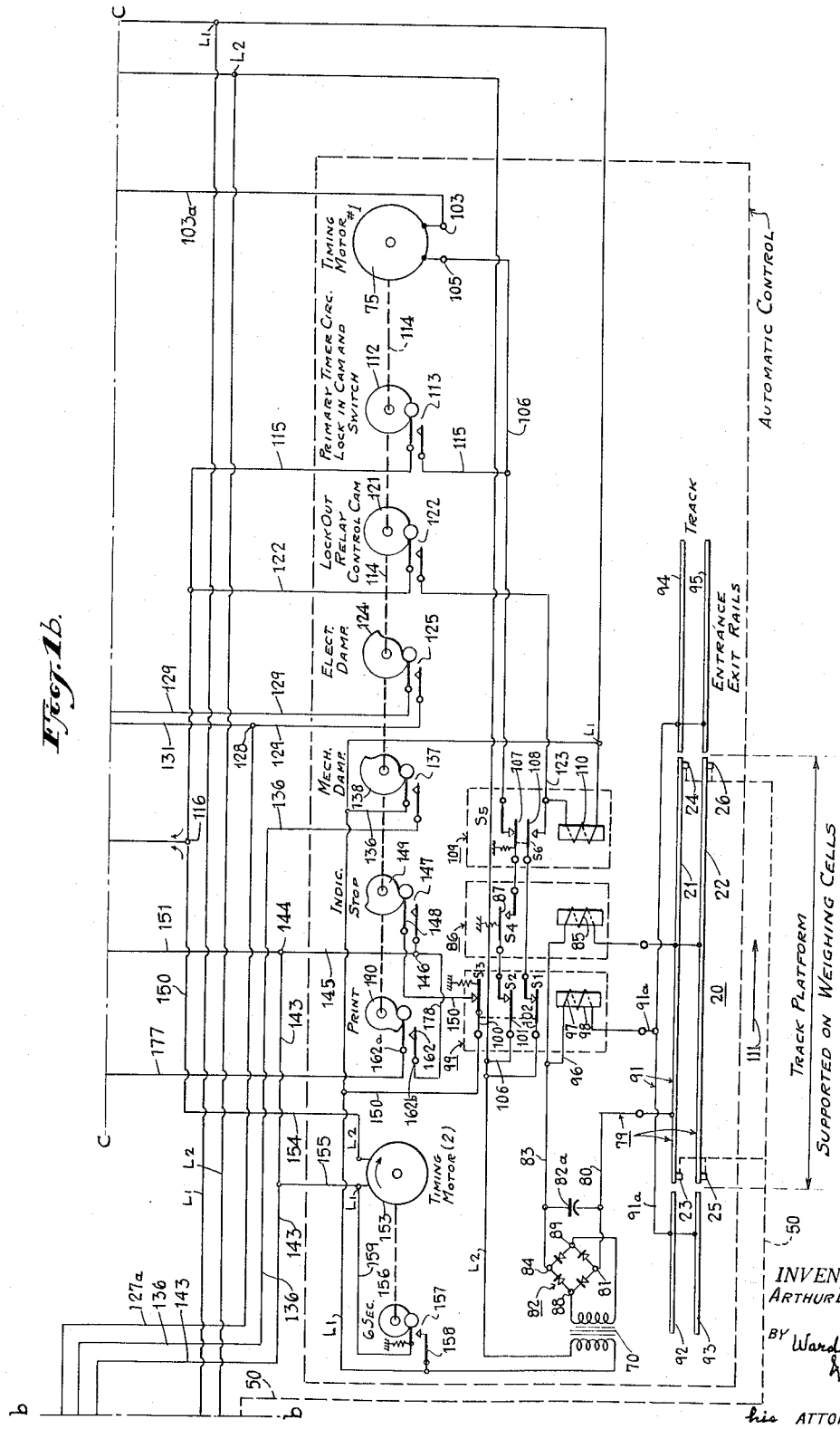

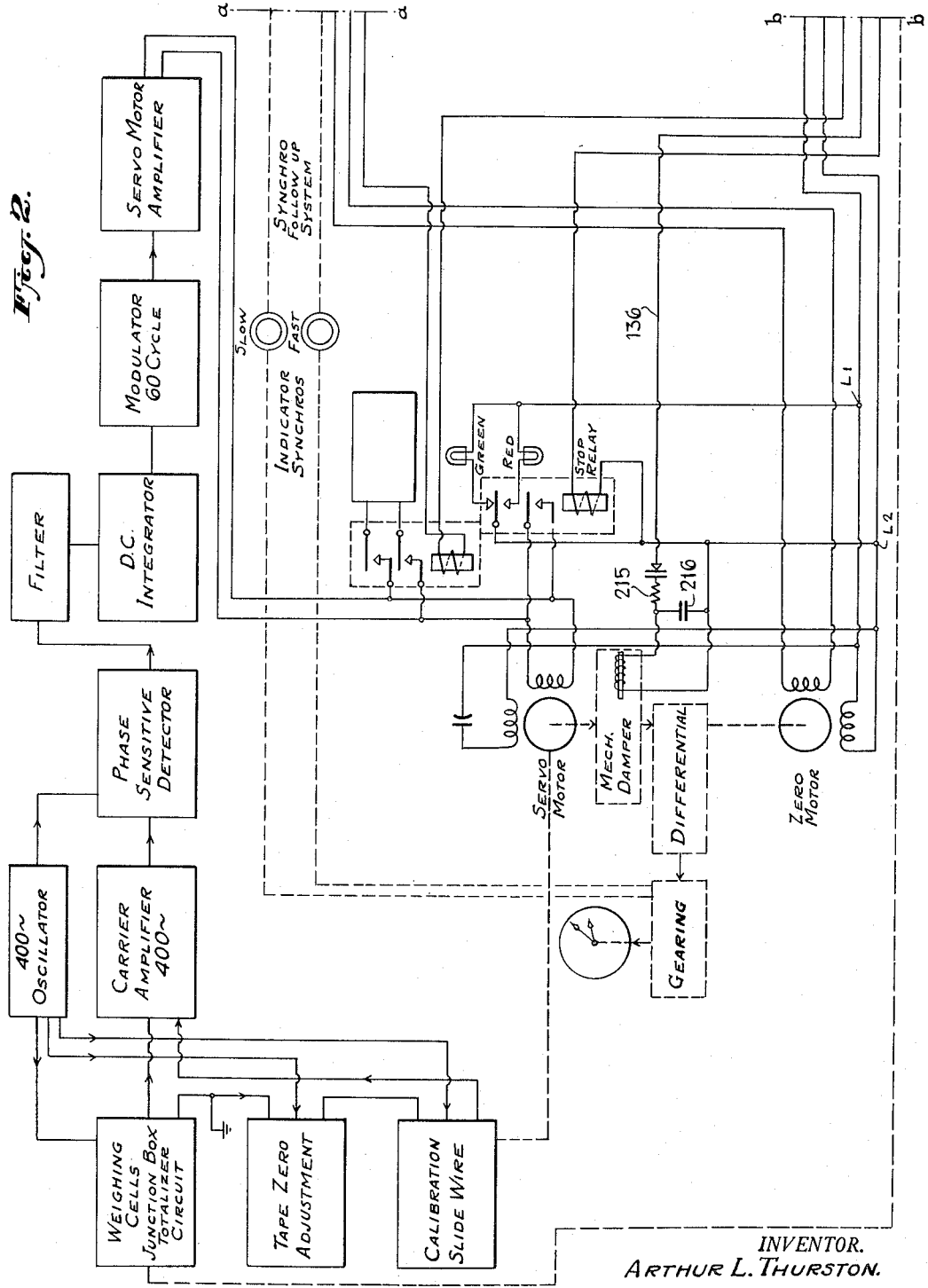

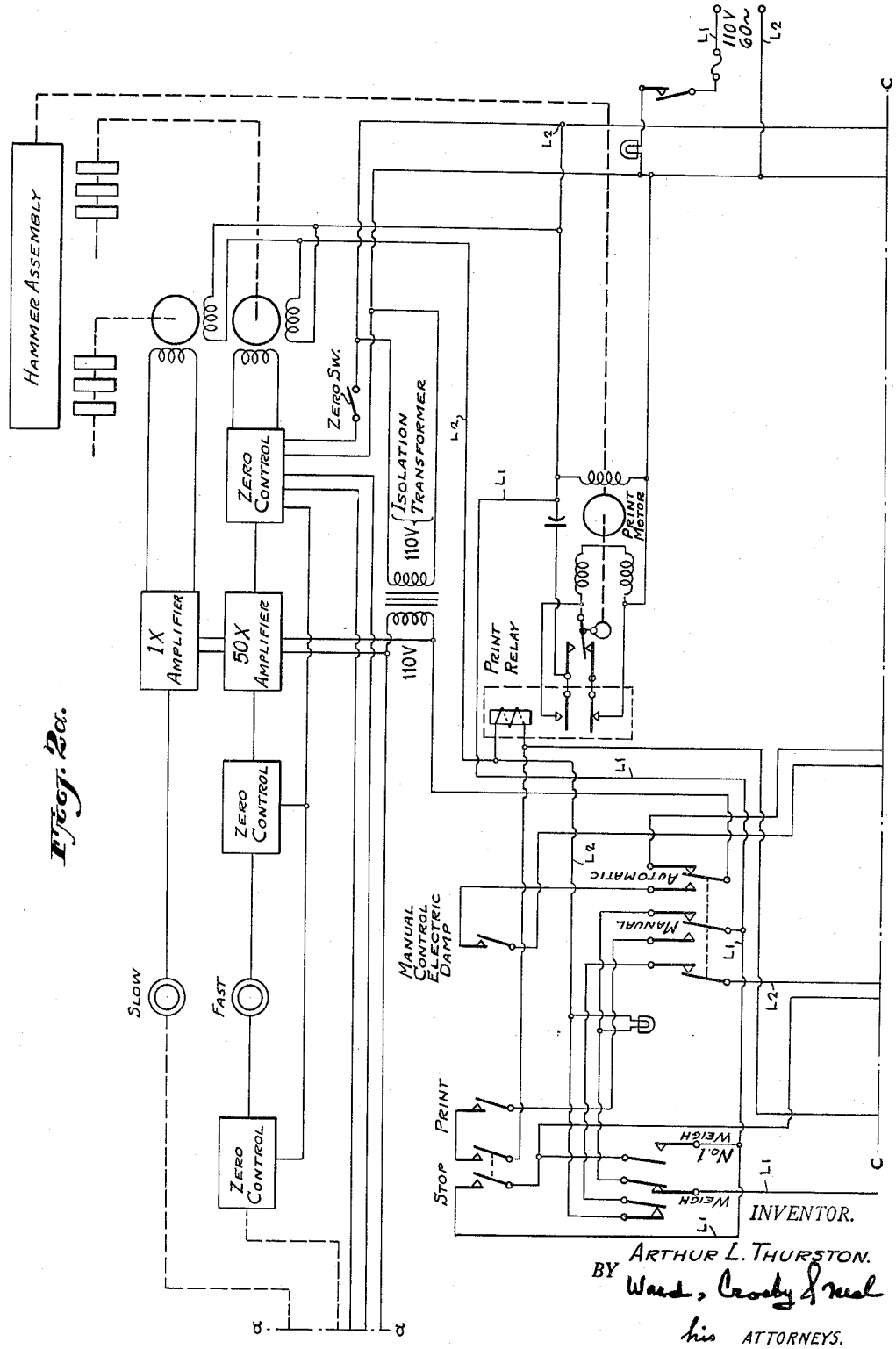

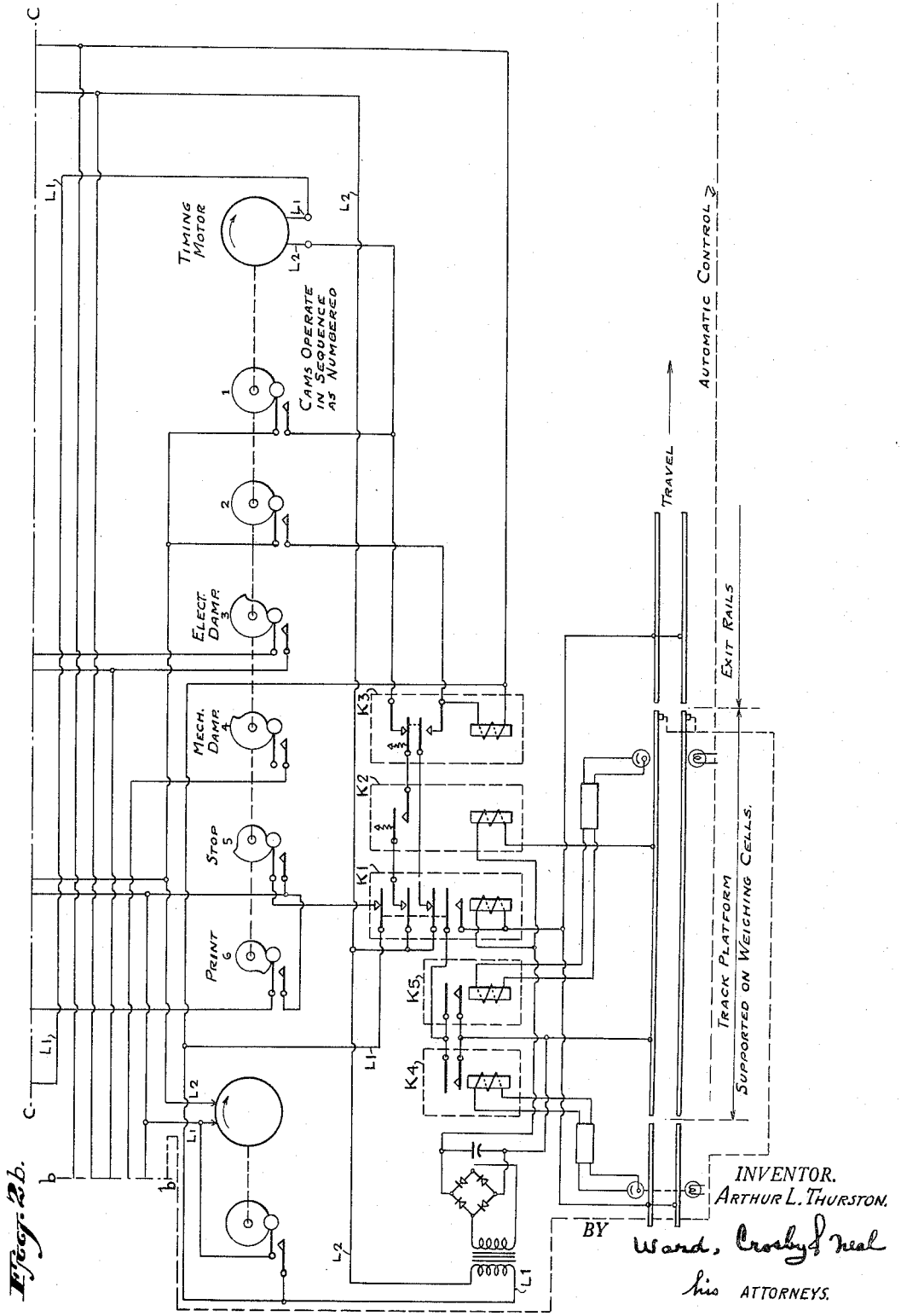

Nov. 15, 1955     A. L. THURSTON     2,723,844
RAILWAY VEHICLE SCALE
Filed May 11, 1953     7 Sheets-Sheet 7
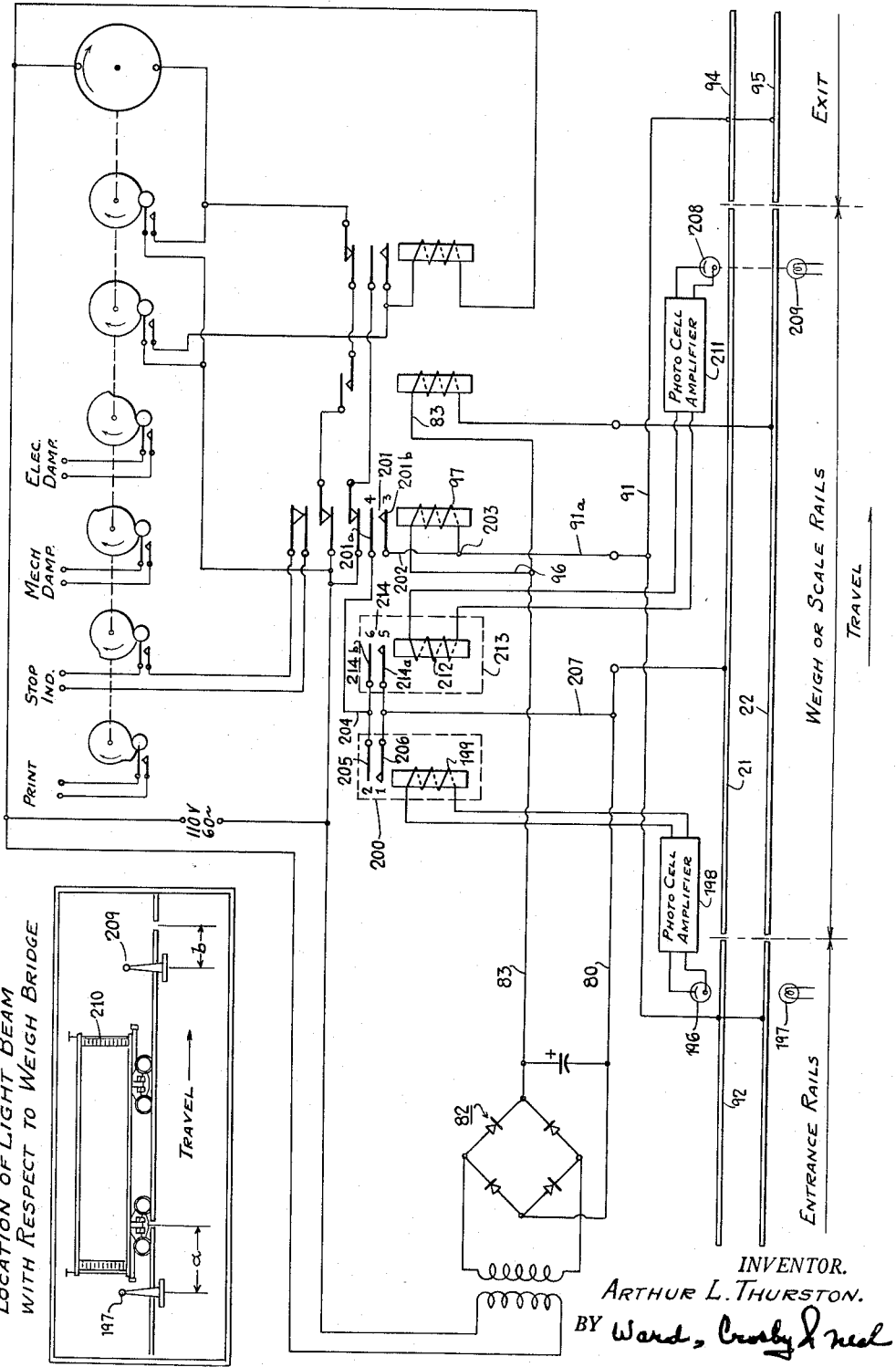
INVENTOR.
ARTHUR L. THURSTON.
BY Ward, Crosby & Neal
his ATTORNEYS.

United States Patent Office 2,723,844
Patented Nov. 15, 1955

2,723,844
RAILWAY VEHICLE SCALE

Arthur L. Thurston, Wantagh, N. Y., assignor, by mesne assignments, to Revere Corporation of America, a corporation of New Jersey Application May 11, 1953, Serial No. 354,097

20 Claims. (Cl. 265—5)

This invention relates to track scale means for the motion weighing of railway vehicles, and more particularly to automatic means for controlling such scales.

One of the problems involved in apparatus of this character heretofore suggested has been that of maintaining proper synchronism of switching means, such as trip switches directly actuated by the wheels. Such switches have been employed in the counting of the number of axles of the vehicle being weighed thereby to control the timing and operation of the scale apparatus. Such switching means heretofore proposed may operate in proper and synchronized relation so long as vehicles pass thereover having no abnormal number or disposition of axles and wheels. However, the passing over such switching means of vehicles having unusual numbers and disposition of axles, as compared to a norm such as in an average freight car, has upset the normal synchronism of such switching means heretofore suggested and has required extremely complicated devices to compensate therefor.

A further problem encountered in prior apparatus of this type has concerned the provision of suitable means for controlling the track scale in the event that a railway vehicle is proceeding thereover at an excessive speed wherein the scale indicia device has insufficient time to reach full weight before the vehicle moves partially off of the scale. Also, the weight indication of the track scales for one vehicle can be spoiled by another vehicle following too closely behind the one being weighed and moving onto the scale during the critical weight measuring interval of the first one. No simple, inexpensive and relatively uncomplicated means have heretofore been devised for overcoming these problems.

One of the objects of the present invention is to overcome the above difficulties or to reduce same to insignificance.

The invention, in one aspect thereof, is constituted by a novel control means for a track scale for weighing railway cars or other railway vehicles individually while in motion or stationary thereupon. Such aspect of the invention presupposes that the front pair of wheels on the front axle of each car are electrically interconnected and also the rear pair of wheels on the rear axle, and furthermore that such front and rear pairs of wheels are electrically interconnected e. g. via the frame of the car. The track scale employs a scale platform having a pair of side-by-side parallel scale rails resting upon a rail or track platform which in turn is supported by strain gauge weighing cell means which are capable of producing an electric signal responsive to the weight upon such rails. A weight indicator is operatively connected by suitable means to the weighing cells for indicating the weight upon the scale rails. Also, a weight digital printer is provided and is operatively connected to the weighing cells (in this case via the weight indicator device although the connection can be direct). Such printer also is provided with indicia means, for example, in the form of type wheels which are positionable in response to the signal from such cells. The weight indicator normally requires a preselected period of time, referred to as "weigh time," for its indicia means to come up from zero to a maximum weight indication. Also, the weight indicator requires a preselected "scale time," that is, the time for its indicia means to move to the car weight after the car is fully and alone on the scale. A desired scale time is, for example, three seconds for the embodiment shown. During the reaching of such car weight, the aforementioned means for operatively interconnecting the weighing cells and the weight indicator undergoes suitable damping action. Thereupon, the indicator is stopped by a suitable electrical locking device at the expiration of such scale time. Immediately thereafter a type wheel alignment period commences during which the type wheels are brought into alignment or agreement with the weight indicator. This period of time is, for example, one and one-half seconds. Thus the car being weighed must be fully and alone on the scale platform during the illustrative scale time of three seconds. The measurement of such scale time commences the instant the last wheel of the car being weighed starts on the scale or the instant the last wheel of the car ahead leaves the scale, whichever occurs last. Means are provided for rendering inoperative the weight digital printer if the front wheels of the car being weighed move off of the scale rails before the expiration of the scale time, that is, if the car is going too fast. Moreover, means are provided for rendering the printer inoperative if the wheels of the following car move onto the scale rails before the expiration of such scale time. The above is accomplished with the assistance of certain track circuits and a pair of entrance rail members and a pair of exit rail members which are respectively situated at the entrance and exit extremities of the scale rails and are in alignment therewith. The novel control of the weighing and printing apparatus is effected by means of a pair of such track circuits, the first of which is referred to as a "scale rail circuit" (primary circuit) which includes both of such rails of the scale platform (scale rails). The scale rail circuit is normally open but is closable by means of the wheels of a railway car interconnecting same via their axle. The other track circuit is referred to as a "rail member circuit" (secondary circuit) and includes one of said entrance and one of said exit rail members and also one of said scale rails. It is normally open but is completed by means of a single wheel straddling the gap between one of such rail members and said scale rail or is completed by virtue of an electrical interconnection from a car wheel engaging a rail member and another wheel of the same car engaging a scale rail, there being an electrical interconnection between such wheels, e. g., via the frame of the car. The aforementioned means for rendering the printer inoperative are under the influence of said secondary circuit, that is, if the latter is completed during the scale time interval the printer is so rendered inoperative. Such scale time interval is measured by a timer which measures the scale time and certain other intervals, as will appear later. Said timer is under the influence of said two track circuits. An electrical circuit for the timer is provided which is completed (thereby initiating the measurement of the scale time) the instant the wheels on the rear axle of a car move off of the entrance rail members and onto the scale rails and the car is fully on the scale rails, or the wheels of a car ahead move off of the scale rails, whichever occurs last. That is, the preparation of the timer circuit is initiated by concurrent closing of the scale rail circuit and the rail member circuit. The timer circuit is completed in response to the opening of the rail member circuit during the time that the scale rail circuit is closed. Should the car being weighed be travelling at too great a speed wherein it will not remain alone upon the scale rails for the necessary scale time, such car will complete the rail member circuit (by virtue of the wheels of the front axle passing onto the exit rails) and thereby will actuate the means for rendering the printer inoperative. The same will occur if another car should be following too closely behind the car being weighed and should complete the rail member circuit prior to the expiration of such scale time. However, should the scale time expire without the rail member circuit being so completed, then the timer will actuate means which (for the particular time cycle): (a) arrests or locks the motion of the weight indicator, and (b) renders the automatic actuation of the printer independent of a later closing of the rail member circuit.

Various further and more specific objects, features and advantages of the invention will clearly appear from the detailed description given below taken in connection with the accompanying drawings which form a part of this specification and illustrate, by way of example, preferred arrangements of apparatus for carrying out the invention. The invention consists in such novel methods and combinations of features and method steps as may be shown and described in connection with the apparatus herein disclosed.

In the drawings:

Figs. 1, 1a and 1b comprise a schematic diagram of one form of apparatus embodying the invention, Fig. 1a being a continuation of Fig. 1 as taken along line a—a of Fig. 1, while Fig. 1b is a continuation of both Figs. 1 and 1a as taken along lines b—b and c—c;

Figs. 2, 2a and 2b comprise a schematic diagram of a second embodiment of the invention, Fig. 2a being a continuation of Fig. 2 as taken along line a—a, while Fig. 2b is a continuation of both Figs. 2 and 2a as taken along lines b—b and c—c;

Fig. 3 is a further schematic diagram showing on an enlarged scale portions of the embodiment of Fig. 2; and Fig. 4 is a side elevation of a scale platform showing the disposition relative thereto of certain elements of the embodiment of Fig. 2.

Referring to the drawings in greater detail, with particular reference to the embodiment of Fig. 1, the novel apparatus comprises a track scale for the motion weighing of railway cars or other vehicles. A track scale control system is employed which fulfills the following requirements, assuming that the axles and wheels of any given car are electrically connected through the structure of the car:

1. The car being weighed should be fully and alone on the scale for the aforementioned preselected period referred to as the "scale time" (in this embodiment three seconds) which is sufficient to permit the weight indicator means, including the means for operatively connecting same to the weighing cells, to come up to weight. Weight indicator means are employed having a so-called "weigh time," which is the time required under normal weight conditions, for the indicator to move from zero to its maximum weight indication, for example, from zero to 400,000 lbs. This weigh time can be, for example, also three seconds. As each pair of wheels of the first truck of a car move onto the scale, the indications of the weight indicator will increase by an increment or step, and as each pair of wheels of the last truck move onto the scale, the indications of the weight indicator will again increase by such a step. By the time the rear pair of wheels is wholly and alone on the scale, the weight indicator will already have reached about three-quarters of the full weight indication of the car. Despite the fact that the weight indicator will be at such an advanced stage of indication when the car first becomes fully and alone on the scale, it has been found desirable to require a scale time as aforementioned of three seconds. Of course, such scale time can be varied to accommodate the particular weighing apparatus employed. The cars are thus weighed while travelling individually and the cars are electrically insulated from each other.

2. The measurement of the scale time should commence the instant the car is (a) fully on the scale, or (b) the car is fully and alone on the scale, whichever occurs last. That is, the measurement of such scale time must start (a) the instant the wheels of the last axle of the car being weighed move on the scale and off of the entrance rail members, or (b) the instant the wheels of the last axle of the car ahead leave the scale rails, whichever occurs last.

3. The weight digital printer should be rendered incapable of printing the weight of a particular car undergoing weighing if such car starts off the scale before the expiration of the desired scale time, that is, when such car is going too fast.

4. The weight digital printer should be rendered incapable of printing the weight of the car undergoing weighing if a separate and following car starts on the scale rails before the end of such scale time, that is, where a following car is too close.

In Fig. 1, the scale platform is indicated generally at 20 and its scale rails or scale track elements at 21 and 22. Such scale rails 21 and 22 are normally electrically insulated from one another and are in turn supported upon a plurality of strain gauge type weighing cells. This can be accomplished by insulating each of the scale rails along the full length of each thereof by suitable insulation means, such as rubber, and by securing such insulated scale rails upon suitable rail ties and placing such rail ties upon a rail platform which has, for example, one strain gauge type of weighing cell at each corner thereof in a manner analogous to that shown for the weighing cells appearing in Fig. 1 of the United States Patent 2,678,206 of Muldoon et al. Of course, it is possible to employ more than four such weighing cells provided they are connected in a suitable totalizer circuit. In Fig. 1 herein, the association of such weighing cells and rails is schematically indicated, there being two cells shown for each rail. That is, rail 21 is supported by weighing cells 23 and 24 and rail 22 by weighing cells 25 and 26. The scale rails 21 and 22 are electrically insulated from one another as aforementioned for the purpose of facilitating the creation of certain track circuits, as will appear more fully hereinafter. The scale rails are, for example, each about ninety feet long.

The weighing cells 23—26, inclusive, are connected by suitable means to a visual weight indicator indicated generally at 27 having coarse and fine pointers 28 and 29, respectively. The weighing cells also are operatively connected to a weight digital printer or printer unit, indicated generally at 30. The weight indicator 27, is, in the form shown, of a visual character but, of course, it is within the purview of the invention to employ any other type of signal indicator as an alternative, that is, it is not essential to the invention to employ an indicator of a visual character, as at 27. The signal from the cells which is responsive to weight can be sent to the aforementioned printer unit 30 for actuating same, as will be explained more fully hereinafter, without actuating indicator 27. It is, of course, possible, in lieu of employing the visual type weight indicator 27 or the weight digital printer 30, to employ any suitable indicia means which can provide an indication of the weight responsive signal from the weighing cells.

Such weighing cells, when subject to a stress, provide an electrical signal output which is proportional to such stress. Such electrical signal output, in the embodiment shown in Fig. 1, is constituted by a voltage which controls a signal responsive means, for example, a servomotor 31, through the intermediary of a so-called "null system" or "null control means" of which the servomotor is a part. The servomotor 31, in the form shown in Fig. 1, is provided with a field coil 31a, a control coil 31b and a rotor 31c, the connections of which to the remainder of the apparatus will be more fully described hereinafter.

*Operative interconnection between indicator 27 and weighing cells 23–26*

The visual weight indicator 27 and the operative interconnection between it and the weighing cells can be substantially similar to that shown and described in said United States Patent No. 2,678,206. Such interconnection between the cells 23—26, indicator 27 and the printer 30 will be briefly described first and thereafter the novel scale control device:

The electrical voltage output of the weighing cells 23—26, inclusive, is exceedingly small and must be highly amplified and controlled.

The above-mentioned null system employs as one of its principal elements a means for introducing a counter or balancing signal for balancing the total weighing cell signal (hereinafter referred to as the "cell signal"), such means comprising, for example, a slide wire resistance, indicated generally at 32, which is under the influence of the servomotor 31 by means of a suitable operative interconnection which, in the form shown, is a mechanical one and is indicated schematically at 33. The slide wire resistance 32 is so connected into the circuit of the weighing cells 23—26 that a counter E. M. F. or balancing voltage may be introduced into such circuit and a null or balanced condition thereby can be produced which will be attained when such servomotor has been actuated to an extent proportional to the signal output of said weighing cells.

A so-called oscillator-amplifier is employed which is generally indicated at 34. This device, through suitable connections therewithin, as at 35, provides a carrier frequency for the weighing cells and such oscillator-amplifier is also employed for amplifying the output voltage of such cells, as will appear below.

Means are also provided for converting the electrical output of the cells into the motion of the pointers of indicator 27, which motion is linearly proportional to weight. As aforementioned, the servomotor 31 is operatively connected to a signal responsive means which may be remotely located, such as the weight digital printer 30. The operative interconnection between the servomotor 31 and the weight digital printer 30 permits a remote indication of weight for the printing thereof within a negligible or substantially negligible additional time after the servomotor 31 has stopped after adjusting the slide wire element 32 to a null condition. In the form shown, the apparatus is designed for registering loads up to 400,000 lbs. within a time limit of three seconds from the instant when the load is fully and alone on the scale. This requires that the servomotor 31 and the coarse and fine pointers 28 and 29 move from zero up to 400,000 lbs. marked on a suitable dial therefor, within such three seconds. The remote indicator, for example, the weight digital printer, is prepared for registering such maximum load substantially simultaneously or in a substantially negligible time (e. g. within one and one-half seconds) after the time that such pointers 28, 29 reach this maximum mark.

The aforementioned weight digital printer 30 employs a printing device also substantially similar to that shown and described in such Patent 2,678,206, and a portion of such digital printer is shown at 36 comprising a plurality of type wheels 37 having embossed upon their peripheries numerals for indicating the weight which is also registered upon the weight indicator 27. The type wheels 37 are divided into two groups, 37a and 37b, and each such group of type wheels is driven by a separate means, that is, there is one operative interconnection between wheel group 37a and the servomotor 31, and a separate operative interconnection between wheel group 37b and such motor.

The movement of the servomotor 31 is, as aforementioned, indicated upon the dial therefor by means of coarse and fine pointers 28 and 29. The groups of type wheels 37a and 37b respond respectively to such coarse and fine indicators. Due to the extreme speed at which it is necessary for the fine pointer 29 to move, it is not practical to have the fine type wheels 37b move in step therewith. In fact, in the embodiment herein described, it is believed to be substantially impossible (due to inertia and frictional problems) to force the fine type wheels 37b to follow the fine pointer 29. In order to overcome this difficulty without any appreciable loss of speed, the operative interconnections between such groups of wheels 37a and 37b with the servomotor 31 and with the pointers 28 and 29 is constituted by two separate self-synchronous transmitter and receiver systems. Such systems are generally referred to as "synchro systems" and each is provided with its own transmitter and receiver. A coarse synchro system is indicated generally at 38 and a fine synchro system is indicated generally at 39. The former system is provided with a transmitter 40 and a receiver 41. The latter system is provided with a transmitter 42 and a receiver 43.

The servomotor 31, for example by suitable mechanical means schematically indicated, is operatively connected to the transmitters 40 and 42.

The coarse synchro receiver 41 is operatively connected with the coarse type wheels 37a by means of a coarse servomotor 44 having a control coil 44a, an exciting coil 44b and a rotor 44c. The control coil 44a is electrically connected to the rotor of the coarse receiver through the intermediary of a suitable amplifier 45 and the rotor 44c is mechanically interconnected to the rotor of the coarse receiver 41 for driving same. When the coarse receiver rotor gets out of step with the rotor of the transmitter 40, a voltage will be generated which is amplified by the amplifier 45 and which will actuate the coarse servomotor 44. The latter, by means of its operative interconnection with the coarse receiver rotor, will move such rotor into step with the rotor of the transmitter 40. In view of the relatively slow movement of the rotor of the transmitter 40, it is possible for the repeater system, including rotor 44c of the servomotor 44, to follow or track the rotor of transmitter 40 throughout its range of movement.

The fine or fast synchro receiver 43 is similarly operatively associated with the fast or fine type wheels 37b through the intermediary of a fine servomotor 46 having a control coil 46a, an exciting coil 46b and a rotor 46c. The control coil 46a is connected to the coils of the rotor of receiver 43 by suitable electrical means, including an amplifier 47, which is analogous to amplifier 45.

The rotors of the transmitters 40 and 42 are in geared connection so that when the slow rotor makes one revolution, the fast one, for example, makes fifty revolutions, these revolutions corresponding to a traverse of the indicator pointers 28, 29 from zero to 400,000 lbs. It has been determined that in a weighing device of this character, the above-mentioned weigh time limit of three seconds is substantially the maximum that should be required for the visual indicator and its servomotor to reach their maximum indications from zero to 400,000 lbs. Of course, the time required will be proportionally less for lighter loads. In accordance with the gear ratios existing in the present apparatus, if the fine receiver 43 were to follow the fine transmitter 42 exactly, it would be necessary for such receiver 43 to make fifty revolutions in three seconds (1,000 R. P. M.). The type wheels 37b would have to make five hundred revolutions in three seconds (10,000 R. P. M.) and the servomotor 46 would be required to make four thousand one hundred sixty-six revolutions in three seconds (83,333 R. P. M.). Such angular velocities are impossible in this type of mechanism. However, by separating the coarse and the fine synchro systems into units which are independent of each other mechanically, with the exception of the geared interconnection between the rotors of the transmitters 40 and 42, it is not necessary for the fine or fast system to follow exactly either the fine indicator 29 or the rotor of the fine transmitter 42. As the rotor of the fine receiver 43 attempts to follow the indicator 29 or the fast transmitter 42 at high speed, it cannot do so and consequently oscillates back and forth while the fast pointer 29 is traversing its dial. When such fast pointer slows down, as it does when it approaches the proper weight indication, the fast or fine receiver 43 "pulls into step," that is, the rotor of the fine receiver 43 moves into synchronism with the rotor of the fine transmitter 42 whereby both the fine pointers 29 and the fine type wheels 37b arrive at the same weight substantially simultaneously or within a very short time thereafter such as the aforementioned period of one and one-half seconds.

When the type wheels 37 have been moved, as above set forth, by the servomotors 44 and 46 in response to a load upon the platform 20, such type wheels are aligned for printing in a straight line by a so-called sequential indexing device (not shown) similar to that described in said Patent No. 2,678,206, whereupon a print switch, to be described hereinafter, is momentarily pressed, either automatically or by hand, and the weight of the car is printed upon a scale ticket 48 (Fig. 1a), together with other desired information by means of a hammer assembly, the hammers of which strike the ticket and urge same against the type wheels and a suitable marking or "carbon" tape.

One manner (not shown) of interconnecting the strain gauge means within a single weighing cell (23—26) consists of a bridge arrangement of resistors somewhat analogous to a Wheatstone bridge wherein two opposite arms, consisting of the strain gauge means of a given cell, are subject to change due to loading and the other two arms are fixed resistances having associated therewith suitable temperature sensitive means which compensate for so-called "zero unbalances" due to temperature variations of the cell.

Each of such cells is preferably referred to as a weighing cell and the above arrangement of resistors is referred to as a cell bridge. It is, of course, possible to arrange the electrical resistance type strain gauge means in other suitable circuits. The invention is not limited to such a cell bridge. In order to compensate for the "zero unbalances" due to temperature variations of the cell, there may be connected in series with each cell bridge and its voltage source a temperature sensitive resistance with a linear characteristic which adjusts the voltage of such bridge to compensate for the linear change in the weight-voltage ratio of the output thereof, which change may occur with temperature change. The present apparatus is accurate within plus or minus 100 lbs. over a range of 400,000 lbs., an accuracy of .025%. Consequently the compensation for temperature variations in each cell are accurate and stable.

Such cell bridges and temperature compensation resistances are shown and described in said Patent 2,678,206.

The apparatus is connected to a suitable source of electric energy (not shown), the power lines of which are indicated at Fig. 1 at $L_1$ and $L_2$. This source of energy is connected to the amplifiers, modulators, demodulators, and so forth, as shown in Fig. 1, and by suitable means, sometimes referred to as a "power supply element" (not shown), provides a high plate supply voltage electronically stabilized and a stabilized sixty cycle tube heater voltage.

The oscillator-amplifier, generally shown at 34 (Fig. 1), will now be described. The aforementioned power supply element is electrically connected to an oscillator 49, the purpose of which is to provide a voltage source for the weighing cells 23—26. The oscillator 49 may be a conventional feedback, resistance-capacity type with a degenerated stabilized buffer stage. It provides a source of carrier voltage of constant amplitude and constant frequency to the weighing cells and also to the calibration slide wire 32, the frequency being about four hundred cycles.

It is desirable for the voltage output to such weighing cells to alternate with the frequency of about four hundred cycles, which is chosen as a compromise, taking into account the sixty cycles interference of the power line. Such frequency is also chosen in order to facilitate the elimination of the effects of random capacity variations which occur with time and with the displacement of the cables which connect the weighing cells to the remainder of the apparatus (oscillator-amplifier 34). The servomotor 31 is, for example, of a sixty cycle two-phase type and it is desirable to use a carrier voltage frequency for the weighing cell circuit which is considerably removed from the servomotor frequency. The output signal of the oscillator 49 thus is of four hundred cycles, preferably of five volts.

A conjugate arm of each of the cell bridges of cells 23—26 is connected to the output terminals of the oscillator 49 by suitable leads (not shown). The opposite conjugate arm of each of the cell bridges is connected by means of a lead 50 to a totalizer circuit 51 and thence to a carrier amplifier 52 via a connection 53.

The weight on the several weighing cells is totalized electrically by current addition in the totalizer circuit.

In order to adjust the scale zero indication, for example, upon the dial of the indicator 27, to zero for tare, an electrical zero adjusting network is provided at 54 (tare zero adjustment). Such network can employ a suitable potentiometer (not shown) which is electrically connected to the oscillator 49 by means of connection 55 which can include leads which are connected across a variable resistance of such potentiometer. Thus the voltage source of such potentiometer is the same as that of the weighing cells and is preferably of the same extent, namely, five volts. This zero adjusting network is connected preferably in series with the output of said totalizer circuit in a manner analogous to that of the aforementioned Patent 2,678,206. The above zero adjusting network is separate from means, to be later described, for adjusting scale zero for tare in response to synchro transmitter 42.

In series with the last-described circuit (tare zero adjustment) is a so-called "balancing network" which employs the above-described slide wire resistance 32, which is the main element of the null system above mentioned.

The output voltage of the weighing cells is designated $e_s$ and can be represented as $e_s = f_1 W_t$. The term "$f_1$" is employed in its usual mathematical sense and here indicates that $e_s$ is a function of $W_t$. The latter term refers to applied total weight. Against such voltage $e_s$ there is balanced a counter E. M. F. by means of said balancing network. The latter includes said slide wire resistance 32 which is adjustable under the influence of the servomotor 31. The calibration slide wire consists, for example, of a resistance wire which may be fixed relative to a movable contact or slide wire brush also in a manner similar to that described in said Patent 2,678,206.

The voltage of the balancing network, of course, is varied by motion of such slide wire brush in response to the servomotor 31 whereby input voltage to the amplifier 52 can be restored to null. Motor 31 is initially energized by the amplified signal from the weighing cells which is acted upon by electrical elements to be described below.

The amplification apparatus is divided into two stages, that is, the voltage gain is divided between two sections, the first or so-called "carrier amplifiers" which provides a net voltage gain at four hundred cycles of, for example, 20,000 or 86 decibels, and the second section or "servo amplifier" which provides a voltage gain at sixty cycles of 1,000 or 60 decibels.

As above mentioned, the total voltage of the weighing cells is expressed as $e_s = f_1 W_t$ and is also referred to as the cell unbalance voltage. The voltage supplied by the balancing network, that is, the counter E. M. F., is designated as $e_b=f_1 W_{to}$. In the above $W_t$ as aforementioned designates the applied total weight and $W_{to}$ designates the indicated weight, that is, the weight indicated by the servomotor 31. The voltage of the circuit at the input terminals of the carrier amplifier 52 is designated as $e_i$ or input voltage, that is, the voltage input to the carrier voltage amplifier. It is also referred to as a difference voltage. The voltage $e_i$, of course, is the difference between the cell voltage and the balancing voltage and is expressed as follows: $e_i=f_1(W_t-W_{to})$. The input voltage $e_i$ is of the carrier frequency, namely, four hundred cycles, and is directed to the carrier voltage amplifier 52.

In weighing of so-called "live loads," that is, loads which are not considered dead weight, for example, a moving freight car, it is considered highly desirable to arrive at a weight balance quickly, that is, to arrive at a weight indication quickly, but when balance has been reached, to reject from the weight indication any indications which are attributable to the movement of the load. Such undesired indications which are attributable to the movement of the load are referred to as "acceleration indications" and such moving loads are referred to as "acceleration loads." Thus it is desired for the apparatus to have a high speed of response to a dead weight and to have a slow speed of response to the so-called "acceleration loads" which, of course, are random in nature and are referred to as "random accelerations" or "random acceleration loads." The apparatus should be so designed that while it is coming to balance with a load upon the scale platform 20, the speed of response will be high but when appropriate balance is attained, the random acceleration loads then must be rejected and the speed of response of the apparatus may then be reduced by suitable dampening means to be described hereinafter. It is possible to reduce sensitivity or response of the indicator 27 to such random accelerations by increasing the electrical dampening of the apparatus when it nears the balance condition and also by electrical integration or averaging.

The output of the carrier voltage amplifier 52 is acted upon by suitable electronic means for improving the stability of the servo-system to prevent overshooting due to mechanical inertia, is thereafter further amplified to provide the additional voltage gain, and thereafter is fed to the servomotor 31. The means for accomplishing this, in the form of the invention shown, comprise a demodulator or so-called "phase sensitive detector" 56 to which is fed the four hundred cycle amplified difference voltage signal, that is, the amplified voltage $e_i$. The demodulator 56 converts the output signal of the carrier amplifier 52 into a phase sensitive direct current. A plus or minus D. C. voltage thus is produced by the demodulator 56 dependent upon the phase of the input signal. The D. C. signal voltage emanating from such demodulator is thereafter filtered in a low pass filter 57 to remove demodulation harmonics and any undesirable sixty cycle noise which may have picked up in the carrier amplifier 52. The electrical and mechanical dampening means, one of which is shown at 76, primarily act to eliminate the effects of such random acceleration. The integration and/or differential networks above mentioned may assist in this.

The output of the low pass filter 57 is fed to an integration and/or differentiation circuit indicated schematically at 58. The latter is for the purpose of filtering out undesirable frequencies for dampening the signal in order to prevent said overshot by the indicating pointers of their accurate weight indications.

The phase sensitive demodulator 56 converts its input, as aforementioned, to a D. C. phase sensitive voltage, the amplitude of which, if there are no random acceleration loads present, will not be modulated. However, if such acceleration loads exist, there will be a random modulation of such amplitude and thus a random frequency of the super-imposed envelope, that is, a random modulation of the carrier frequency.

Regarding the phase sensitive aspect of the demodulator 56, this characteristic is necessary in order to control the direction of rotation of the servomotor 31 which, of course, depends upon the polarity of the direct current output of such demodulator 56. When the balancing voltage $e_b$ is, for example, less than the cell voltage, then there will be a positive polarity of the phase sensitive output of the demodulator 56 and vice versa.

The integration and/or differentiation element 58 always provides some degree of elimination of the effects of random accelerations. However, as above mentioned, it is desirable for the apparatus to have a high sensitivity to a dead weight and a low sensitivity to the random accelerations. In order to achieve the low sensitivity or low response to the random accelerations, the extent of integration and/or differentiation can be increased by manually or automatically controlled means. For example, when the scale device approaches the balance condition, suitable automatic means can be actuated for reducing, in a greater degree than theretofore in effect, the sensitivity of the device to such random accelerations. Of course, manually controlled means can also be employed. In the form of the invention shown, the means for reducing the sensitivity of the apparatus is controlled manually in a manner similar to that shown and described in said Patent 2,678,206, that is, by a manually controlled switch designated as a "fast-slow" switch. When such switch is closed, the apparatus is at so-called "slow response" or reduced sensitivity to random accelerations and when the switch is opened, the sensitivity is relatively higher.

The integration and/or differentiation element 58, depending upon the particular use of the apparatus, will provide more or less integration and/or differentiation and in certain uses of the apparatus it is conceivable that none will be needed. For example, if it is desired to weigh only a so-called dead weight wherein no random acceleration loads are encountered, the element 58 will not be needed.

By employing the above-described sensitivity control, it is possible for the servomotor 31 and the pointers 28 and 29 to accelerate rapidly to speed in the presence of an unbalance or load and as a balanced condition is approached, such pointers and servomotor can be decelerated rapidly and can approach accurate full weight indication or balance without so-called crawl or overshot of the mark. A high torque gradient is desirable and is obtainable by means of this circuit at balance condition of the apparatus. Such high torque gradient is important in order to reduce to a negligible degree the so-called "lost motion" or "dead space" at the balance condition.

By employing electrical integration with respect to the output of the demodulator 56, the signal is critically dampened by so-called "viscous speed feedback".

The direct current signal voltage emanating from the demodulator 56 and modified by dampening and integration, as explained above, is applied to the input of a balanced modulator 59, the output of which is a sixty cycle A. C. signal voltage of a phase determined by the polarity of the above-mentioned D. C. signal output of the demodulator 56. This sixty cycle voltage is then amplified by a push-pull stage of voltage amplification and thereafter by a push-pull stage of power amplification in a suitable voltage amplifier 60. The output of the latter is applied to the servomotor 31 through the intermediary of a suitable transformer (not shown). The control coil 31b of the servomotor 31 is electrically connected to such transformer and the exciting coil 31a of such motor is connected to the sixty cycle 110 volt power supply, as indicated in Fig. 1.

The servomotor 31, as aforementioned, is operatively connected with the slide wire element 32 and controls the movement of a slide wire brush (not shown) which moves relative to the wire or resistance thereof. Such servomotor is of low inertia. Said exciting coil 31a is connected to the power supply through a condenser, as at 31c, the latter producing a 90° phase shift between the exciting coil and the control voltage. The control voltage in the control coil 31b is, with respect to this phase, plus or minus 90°, depending upon the direction of unbalance, and the motor 31 thus will run in a direction to restore balance and in so doing operate the pointers 28, 29 in the manner above explained.

As above mentioned, the servomotor 31 is connected to the synchro transmitters 40 and 42 in such a manner that when the slow transmitter 40 makes one revolution, the fast transmitter 42 makes fifty revolutions. The transmitters 40 and 42 therefore transmit electrically the positions of the high and low speed pointers. Said transmitters thus can be used for the control remotely of a device such as the above-mentioned printer 30.

*Zero reset of pointers 28 and 29*

In the normal operation of a scale, certain residual loads may occur thereupon or so-called instrument drift may arise. Such residual load and drift make it necessary frequently to apply a tare correction, that is, to reset the indicator pointers 28 and 29, particularly the latter, to zero. For example, there may be a residual load or drift aggregating 50 lbs. when the platform is empty, which will be accurately indicated upon the visual indicator 27. The pointers 28 and 29 should be accurately reset to zero. In order to accomplish this with maximum accuracy and freedom of operator error (deliberate or inadvertent), provision is made for resetting the indicators 28, 29 to zero either automatically or manually. If desired, automatic actuation of the zero reset means can be effected in response to the approach of a railway car, which car may actuate a suitable switch. In the form shown, provision is made only for manual actuation of the zero reset means.

Such reset device is termed a "zero reset element" and will now be described. Means are provided which are responsive to the voltage output of the fast synchro transmitter 42, which output is suitably amplified, for example, by amplifier 47 and thereupon fed to suitable means, such as a zero reset servomotor 61, for introducing the desired correction to the indicator pointers 28 and 29, and simultaneously by an operative interconnection adjusting the rotor of the fast transmitter 42 in such a way that the voltage output thereof is reduced to zero.

The zero reset mechanism, in the embodiments shown, comprises the zero reset motor 61 which, for example, is of a two-phase sixty cycle A. C. variety having an exciting coil 61a and a control coil 61b, the former being connected to the 110 volt sixty cycle power supply. The latter coil is electrically associable with the output of the fast or fine amplifier 47 by means of a series of switches, as at 62, 63 and 64. In general the zero reset motor 61 introduces a zero adjusting correction to the pointers 28 and 29 through the intermediary of a differential 65 which is in turn also under the influence of the servomotor 31 in a well known manner. The output of the differential 65 is, by suitable interconnections, such as a gear train 66, in driving association with the coarse and fine pointers 28 and 29, and by similar means, schematically indicated at 67 and 68, is in driving connection with the transmitters 40 and 42.

The means for actuating the zero reset servomotor 61 in response to a residual load, that is, in response to a voltage output of the synchro transmitter 42, are as follows: A manually controlled zero reset switch 69 is momentarily closed, as by finger pressure, which energizes a pair of relays 70 and 71, the first of which actuates the zero reset switch 62, and the second of which actuates the zero reset switches 63 and 64. In addition, a so-called thermal timer relay 72 is energized, having a relay holding contact in series with its timer control contacts. Normally upon the release of the switch 69 to its normal open position, such switch actuating relays would become deenergized. However, such thermal timer and its associated relay device operate to maintain such switch actuating relays in an energized position for a period, for example, of five seconds. When the relay 70 is energized, the switch means 62 are thrown to such a position that the synchro receiver 43 is in effect bypassed and two of the leads of the rotor of the transmitter 42 are connected to the amplifier 47 via the switch means 63, the switches 62 and 63 being of the two-way type. The switch means 63 are interposed intermediate the rotor of the receiver 43 and its amplifier 47 in the interconnecting lead means therebetween.

The control coil 61b of the zero reset motor 61 is connectable across the output terminals of the amplifier 47 by means of leads 73 and 74 through the switch 64 which is of the two-way variety and which normally is in such a position as to interconnect the servomotor 46 with said amplifier 47. However, upon energization of the relay 71 to which the two-way switch 64 is operatively connected, the latter is thrown to a position whereby the zero reset motor control coil 61b is connected across the output of the amplifier 47 and the servomotor 46 is disconnected from such amplifier.

Consequently upon the momentary closing of the zero reset switch 69, all of the switches 62, 63 and 64 are shifted substantially simultaneously to such a position that the control coil 61b, as aforementioned, is connected across the output of the amplifier 47 and thus across the amplifier output of the synchro transmitter 42. The latter, of course, governs a voltage in response to the position of the fine indicator pointer 29.

The energization of the zero reset motor control coil 61b actuates the zero reset motor 61 and introduces a correction to said pointers 28 and 29 and also the synchro transmitter 42, whereby the rotor of the latter is reset to its zero position. That is, when said synchro transmitter 42 reaches a position corresponding to scale zero, its voltage becomes zero and the zero reset motor 61 stops. The five second interval during which the relays 70 and 71 are maintained in an energized condition is normally sufficient time to allow the zero reset motor 61 to correct any usual shifting of the pointers 28, 29 due, for example, to residual load. At the end of such five second interval, the thermal timer 72 deenergizes the relay thereof and thereupon the relays 70 and 71 are both deenergized, dropping the circuits back into their normal conditions.

*Scale control means*

I have found it desirable to control the afore-described apparatus of Fig. 1 according to the following time schedule:

(a) *Zero time.*—A timer 75 is started which, with the assistance of related control mechanism, actuates in preselected sequence certain of the scale control devices. The time for the visual weight indicator 27 to come up to full weight after the wheels of the rear axle of a car have moved onto the scale rails is, for example, three seconds, that is, three seconds after zero time. With four axle cars, the indicator is approximately up to three-quarters full weight when the wheels on the rear axle move onto the scale.

(b) *At one second.*—Suitable electrical damping means 76 for servomotor 31 are actuated.

(c) *At two seconds.*—Mechanical damping means 77 for such motor are actuated.

(d) *At three seconds.*—A so-called "stop indicator device" 78 is actuated which is effective to stop and lock the visual indicator 27. After this time (three seconds), the front wheels of a car on the scale platform can move off of the scale rails without effecting the subsequent operations of the scale as a whole, that is, providing a following car does not move on the scale platform before the expiration of such three seconds.

(e) *At four and one-half seconds.*—The printing mechanism is actuated and the print cycle starts. Although the slow type wheels 37a of the printer 30 move in precise step with the slow or coarse pointer 28 and the fine type wheels 37b move into step with the fine pointer 29 substantially simultaneously I have found it desirable to delay the actuation of the printer for one and one-half seconds following the stopping of the visual indicator by the aforementioned stop indicator device 78. This provides adequate time for accurate alignment of the type wheels.

(f) *At five seconds.*—The timer 75 stops.

(g) *At five and one-half seconds.*—The print cycle terminates.

The control system embodying this invention is based upon the criterion that the car to be weighed is fully and alone on the scale platform for the aforementioned preselected scale time which, in the form shown, is three seconds. The timer 75 controls a plurality of cams, as aforementioned, for effecting the above mentioned: (a) electrical dampening, (b) mechanical dampening, (c) stopping of the indicator, and (d) actuation of the printer. The novel apparatus prevents the actuation of the printer under the following contingencies: (a) the car is going too fast so that its front wheels move off of the scale rails (track platform) before the expiration of such three second scale time, or (b) the car following the one on the scale is too close and the front wheels thereof move onto the scale rails before the expiration of such three-second period. Furthermore, the printer control means are arranged such that printing will occur only when the visual indicator 27 is in its "stopped" or "locked" position.

The main timer 75 completes one cycle, e. g. five seconds, and stops. Thus, if a car stops on the scale rails 21, 22 the timer will not repeat its cycle.

The novel control means include:

*Scale rail circuit.*—Referring again to Fig. 1, such circuit (also sometimes referred to as a primary track circuit or scale platform circuit) is connected across the scale rails 21 and 22 for the purpose of sensing that at least two vehicle wheels on a common axis engage such rails. Such scale rail circuit is designated generally at 79 and, in the form shown, includes the following: A lead 80 interconnecting scale rail 21 to one terminal 81 of a power source, for example, a rectifier 82; a lead 83 interconnecting the other scale rail 22 to another terminal 84 of such rectifier 82, there being interposed in the lead 83 a control coil 85 (or solenoid) of a relay 86. The latter is provided with a normally open switch 87 to be explained more fully hereinafter.

The rectifier 82, in the form shown, is connected by its terminals 88 and 89 to the secondary of a transformer 90, the primary of which is connected across the main power source via leads $L_1$, $L_2$ providing 110 volts sixty cycle A. C. The transformer 90 reduces the voltage, for example, to 6 volts. A suitable condenser, as at 82a, may be connected across the terminals 81, 84 for assisting in leveling the wave form of the impulses.

*Rail member circuit.*—This circuit, generally indicated at 91, is also referred to as a secondary track circuit and is provided for sensing the bridging of the gap between: (a) one of the scale rails, and (b) one of the entrance rails and/or one of the exit rails. As will appear below, this circuit, coacting with the primary track circuit, governs the principal functions of the control apparatus. Such secondary track circuit includes the following: A lead 91a which electrically interconnects each of a pair of entrance (or exit) rails 92, 93 with an opposite pair of exit (or entrance) rails 94, 95; a lead 96 which is connected to the terminal 84 (in the form shown via a portion of the lead 83); the rectifier 82; and the aforementioned lead 80 connected from the rectifier terminal 81 to one of the scale rails, such as 21. Interposed in the lead 96 is a control coil 97 of a solenoid 98 which controls a relay 99. The latter is provided with three normally closed switches 100, 101 and 102, the switch arms of which are interconnected for movement together.

The scale rails 21 and 22 are insulated from one another over their full lengths, for example, by rubber-like or other suitable insulation. The entrance and exit rails are electrically separate from the scale rails in the absence of being interconnected via a vehicle.

Thus the aforementioned primary track circuit is normally an open one in the absence of the scale rails 21 and 22 being electrically interconnected through the structure of a vehicle resting thereupon, it being clear that the impedance of such circuit is altered from its normal inherent value in response to such electrical association of the scale rails 21 and 22.

The impedance of the secondary track circuit (or rail member circuit) is of a normal inherent value in the absence of a railway vehicle electrically associating said scale rail 21 with any one of the entrance rails or exit rails. Such electrical association is effected via the structure of a railway vehicle bridging the gap between the scale rail 21 and any one of said rail members.

*Timing means and control cam apparatus*

As aforementioned, it is desirable that a vehicle be fully and alone upon the scale rails 21, 22 for a preselected scale time (for example, three seconds) in order to attain an accurate weight indication. This time interval commences the instant the vehicle is upon the scale rails fully and alone. If a vehicle ahead of the one being weighed has not yet cleared the scale rails 21, 22, the measurement of the car scale time interval should, of course not be initiated. Consequently, the aforementioned primary and secondary circuits are associated in such a way that said timing motor 75 is not actuated until the rear wheels of a vehicle being weighed have moved off of the scale rails and onto the exit rails 21, 22 or the rear wheels of a leading vehicle have cleared the scale rails, whichever occurs last. To accomplish this, one terminal 103 of the timing motor 75 is connected to $L_1$ via a lead 103a and a manually operated switch 104, to be explained more fully hereinafter. The other terminal 105 of the timer, by means of lead 106, is connected to $L_2$. But interposed in the lead 106 are the aforedescribed switches 87 and 101 which are respectively normally open and normally closed. Also interposed in the lead 106 is a normally closed switch 107, the purpose of which will appear herebelow. The switch arm of normally closed switch 107 is operatively connected to the switch arm of normally open switch 108, both of which switches comprise parts of a relay 109 having a control coil 110. The interconnection between switches 107 and 108 is such that when switch 107 is closed, switch 108 is opened and vice versa. The relay 109 is normally referred to as a "lockout" relay and is designed to prevent a repetition of the time control cycle of the motor 75 (and its connected cams) caused by: (a) a vehicle moving too slowly on the scale rails, or (b) a vehicle stopping for an appreciable time on such rails.

The timer motor 75 thus is normally inoperative in the absence of a railway vehicle. However, a vehicle moving, for example, in the direction of the arrow 111 will act upon said track circuits as follows: The front wheels (interconnected through an axle) of the vehicle first engaging the scale rails 21 and 22 will alter the impedance of the primary circuit 79 thereby energizing the solenoid 85 and closing the normally open switch 87. However, simultaneously there will be a bridging of the gap between the scale rail 21 and rail 92 thereby electrically interconnecting same, via the structure of the vehicle, and energizing the solenoid 98. This opens the switch 101 which thus temporarily interrupts the timer circuit and prevents operation of timer 75 until the secondary circuit 91 has become deactuated or deenergized. The latter will occur when the vehicle is fully and alone upon the scale, that is, when the rear wheels of such vehicle have passed off of the entrance rails (e. g. 92, 93) or the rear wheels of a vehicle ahead have passed off of the scale rails 21, 22, whichever occurs last. When the secondary circuit 91 thus has undergone such change of impedance and the solenoid 98 has become deenergized, the switch 101 will close and temporarily complete the circuit of the timer motor 75.

In designing the embodiment of Fig. 1, it is presumed that there is an adequate electrical interconnection between all the wheels of a vehicle being weighed, through the truck and frame or body structure. The embodiment of Fig. 2 is designed to compensate for a lack of such interconnection from front to rear trucks, as will appear later.

It is desired for the timer motor 75 to complete one time cycle (as aforementioned: five seconds) or its output shaft to make one revolution and thereafter to go out of operation temporarily until reactuated for the weighing of another car. Consequently, a so-called "primary timer circuit lock-in cam" is provided as at 112, having associated therewith a primary timer circuit lock-in switch 113, which is normally open, but which is closed for a full five-second time cycle interval (or whatever interval is selected for the completion of one revolution of the output shaft of the timer 75) once the timer turns the cam 112 a small amount via an operative interconnection with such timer 75 as illustrated schematically at 114. After such five-second period (or whatever period is required for one revolution of shaft 114), the switch 113 opens, breaks the timer circuit and causes the timer 75 to stop.

Such primary timer circuit lock-in cam and switch are capable of closing the timer circuit for the five second period (or the period for one revolution of shaft 114) by connecting the timer terminal 105 to L₂ by means of a lead 115 in which is interposed said lock-in switch 113. The lead 115 is connected to a terminal 116 which in turn is connected to one side, 117, of a manual switch 118. The other side of said switch, via a lead 119, is connected to one side of a manually operated switch 120, the other side of which is connected to L₂. The blade or arm of switch 120 is connected to the movable blade of switch 104 for operation therewith, said switches being movable together to concurrently open or closed positions.

As aforementioned, in order to prevent a repetition of a cycle of timer motor 75 as a result of a vehicle moving too slowly upon the scale rails or stopping thereupon, the relay 109 is provided for: (a) opening a circuit of the timer motor 75 by opening the switch 107 thereof immediately after the timer lock-in switch 113 has been closed, and (b) holding such switch 107 in an open condition so long as the aforementioned secondary circuit is deactuated, that is, so long as the solenoid 98 is deenergized. The latter, of course, occurs so long as the vehicle being weighed remains on the scale rails and does not move onto an exit rail. This is effected by means of the aforementioned switch 102 which is under the influence of the solenoid 98 and which governs the energization of coil 110 of relay 109. The means for accomplishing the above are as follows: a so-called "lockout relay control cam" 121 is provided, also operated by the motor 75 via the interconnection 114, said cam being provided with a normally open "lockout" switch 122. The control coil 110 of the lockout relay 109 is initially energized as a result of the closing of the switch 122 by virtue of one side of said coil 110 being permanently connected to L₁ and the other side being connected to the aformentioned terminal 116 via a lead 123 and in which lead is interposed said switch 122. Thus upon closing of the latter switch, the control coil 110 is energized for a period of five seconds (or any other selected period for one revolution of shaft 114) whereupon said switch is then opened. However, the energization of the coil 110 automatically actuates its own lock-in circuit which is effective to hold switch 108 in a closed position thereby to hold the timer circuit switch 107 in an open condition so long as the secondary circuit remains deenergized. Such circuit will remain deenergized until the car being weighed moves off of the scale onto the exit rails or a following car moves from the entrance rails onto the scale rails. Thus the lockout control switch 122 temporarily energizes the control coil 110 for five seconds (or such period for one revolution of shaft 114) during which time such coil's automatic lock-in circuit is actuated under the influence of the secondary track circuit. Thus the timer motor 75 will be energized for a five-second time cycle and thereafter will stop temporarily to await the removal fully of the car on the scale from the scale rails, and to await the initiation of its next succeeding cycle.

*Electrical damping.*—The primary timer circuit lock-in switch 113 and the lock-in switch 122 are closed as soon as the motor 75 can actuate the cams 112 and 121, respectively. Thereafter the aforementioned electrical damping means 76 are actuated by means of the electrical damping cam 124 which closes, after one second from zero time, a switch 125 which controls the energization of the electrical damping network 76. The switch 125 is closed from one second through five seconds during the time control cycle, and governs the energization of control 126 of an electrical damper relay 127. Such coil on one side thereof is connected to L₂, and the other side theereof via a lead 127a is connected to a terminal 128 which, via a lead 129, is connected to L₁. Interposed in the lead 129 is the aforementioned electrical damping control switch 125, and at the end of such lead a manually controlled switch 130. The terminal 128 is also connectable to L₁ via a lead 131 in which are interposed a manual control switch 132 (for the manual control of electrical damping) and the aforementioned switch 130. The latter switch is of the two-way variety having a movable element 130a which can be moved into engagement with a fixed terminal 130b connected to the lead 129, or a fixed terminal 130c connected to the lead 131.

The electrical damper control coil 126 influences a pair of interconnected normally open switches 132a and 133 thereby to close when the coil 126 is energized, and to connect across the servomotor control coil 31b the electrical damping network 76. Thus, by electrical means, the angular movement of the servomotor is limited and suitably damped.

*Mechanical damping.*—The aforementioned mechanical damping device 77 may be constituted, for example, by suitable mechanical means for temporarily increasing the inertia of the servomotor 31, as by temporarily connecting thereto suitable weight means. For example, a metallic sleeve (not shown) may be positioned embracing a shaft driven by the servomotor but normally disconnected therefrom and, upon actuation of the mechanical damping means, such metallic sleeve can be lowered into engagement with a suitable rubber disc driven by such shaft. The increase in inertia due to the engagement by the metallic sleeve of such rubber disc can provide adequate mechanical damping. The actuation or deactuation of this device is under the influence of a mechanical damping control coil 134 which, on one side thereof, by means of a lead 135, is connected to L₂, the other side, by means of a lead 136, being connected to L₁ via a control switch 137 which is under the influence of a mechanical damping control cam 138. The latter is also driven by the timer motor 75. The switch 137, by means of the motor 75 and the cam 138, is closed from two seconds through five seconds of the time control cycle.

*Visual indicator stopping means.*—In the form of the invention shown, as mentioned above, a desired car scale time has been found to be three seconds, referirng to the period during which a vehicle should be fully and alone upon the scale rails 21, 22 for accurate weighing. Consequently, following the aforementioned electrical and mechanical damping, the visual indicator 27 and the printer type wheels 37a are stopped at the expiration of such car scale time interval. Although it is possible to effect promptly the stopping of the servomotor 31 and the pointers 28, 29 of indicator 27, together with the slow printer type wheels 37a, it has been found not practicable to arrest immediately the fast printer type wheels 37b although they do reach a final weight indication almost simultaneously with such slow wheels 37b. The latter type wheels should be given, for example, one and one-half seconds following the stopping of the slow type wheels to settle down before actuation of the printer unit.

The means for stopping the servomotor 31 and hence the pointers 28, 29 and the interconnected type wheels 37a, in the form shown, comprises means for "shorting" the control coil 31b of the servomotor 31 by means of a switch 139 (which is normally open), one side of which, by a lead 140, is connected to one terminal of the control coil 31b and the other side of which, by means of a lead 141, is connected to the opposite terminal of such coil. The switch 139 is under the influence of a control coil 142 of the aforementioned relay 78. One side of the coil 142 is connected directly to $L_2$ and the other side thereof, by means of a lead 143, is connected to a terminal 144. The latter terminal is connectable to $L_1$ via the following: a lead 145 to a terminal 146 of a "stop indicator," switch 147 (normally open) having a movable arm 148 (under the influence of stop indicator cam 149 drivable by timer 75), a lead 150 to $L_1$. Said relay switch 100 is interposed in the lead 150. The switch 100, as above described, is under the influence of the solenoid 98 and hence of the secondary track circuit. Manual control of the stop indicator relay 78 can be effected via a lead 151 (connected also to terminal 144) through a manually controlled switch 152 which is interposed therein. Lead 151 thus is connectable to $L_1$. Thus when in automatic operation the stop indicator relay 78 will be actuated at the expiration of the scale time interval of three seconds via the switch 148, provided the relay switch 100 is closed. The latter switch will remain closed unless the car on the scale is going too fast and its front wheels move off of the scale before the end of such three-second period, or another car is following too close behind the one being weighed and moves onto the scale rails before such three-second period has terminated.

As above mentioned, should a car remain fully and alone on the scale for the required three-second car scale time interval, the servomotor 31 at that time should be stopped by the stop indicator means above described in order that the printing cycle can be effected. Thereafter the car can move off of the scale without affecting the automatic operation of the printing cycle. That is, after such three-second time interval, the two front wheels of a car on the scale rails can move off of such rails without affecting the subsequent automatic operation of the scale as a whole. Consequently suitable means are provided for locking the stop indicator means (78) in an actuated condition for a suitable period, for example, six seconds, providing the car is theretofore fully and alone on the scale for said three-second time interval. Such means, in the form shown, constitute: a secondary timer motor 153 connected in parallel with the circuit of the stop indicator relay 78 as follows: one terminal of timer 153, by means of a lead 154, is connected to the terminal 116 and hence to $L_2$ via the switches 118 and 120; the other terminal thereof is connected to the lead 143 via a lead 155 and hence is connectable to $L_1$ under conditions similar to those for the stop indicator relay control coil 142 above described.

The secondary timer motor 153 is operatively connected to and drives a secondary lock-in cam 156 which controls a normally open secondary lock-in switch 157, one side of which is connected to $L_1$, as by a lead 158, and the other side of which is connected to lead 155 via a lead 159. Thus in the event that the three-second car scale time interval is reached without actuation of the secondary track circuit (as by a car moving too fast, the front wheels thereof moving onto the exit rails, or another car following too closely therebehind and moving onto the scale rails), the switch 148 will be closed, and the stop indicator relay 78 will be energized thereby immediately energizing the secondary timer motor 153 which automatically closes its own circuit for a period, for example, of six seconds by means of the cam 156 and switch 157. Thus the servomotor, the pointers 28, 29 and the type wheels 37a are immediately arrested. Substantially simultaneously but shortly thereafter the fast type wheels 37b come to rest, the servomotor being so arrested for a period of six seconds during which time the secondary track circuit can be energized without affecting the automatic operation of the printer unit, as will be explained below.

*Printer control means.*—The printing device, as aforementioned, employs the slow and fast type wheels 37a and 37b having type indicia thereupon which cooperate with the aforementioned hammer assembly indicated at 160. Such hammer assembly can be actuated either manually by a finger switch 161 or automatically by a print switch 162 through the intermediary of a print relay 163 which governs a print motor 164.

The operative interconnection between the finger switch 161, the print switch 162, said print relay 163 and motor 164 are as follows: The print relay 163 is provided with a control coil 165 for governing the position jointly of a pair of print relay switches 166 and 167 which are respectively normally open and normally closed, their movable switch blades being interconnected by conventional means so that they move together. Such switches 166 and 167 in turn control the print motor 164. The latter is provided with a field coil 168 and a rotor coil 169. The field coil 168 is conventionally connected across $L_1$ and $L_2$. The rotor coil 169, at one terminal thereof, 169a, is connected directly to said power line $L_2$. However, the other terminal thereof, 169b, is connected to $L_1$ via the print relay switch 166 (normally open). A momentary energization of the coil 165 will close the switch 166, the latter shortly thereafter returning to its open condition. Thus it is desirable to provide a so-called "lock-in" circuit for the print motor to cause same to rotate for a preselected number of revolutions thereby angularly to shift its main control shaft in the hammer assembly preferably through a single revolution, there being a considerable reduction of the gear train between the motor 164 and the main shaft to the hammer assembly 160. Consequently there is provided a print motor lock-in cam 170 which governs a switch blade 171 which is movable between two contacts 172 and 173. The switch blade 171 normally engages contact 172 which via the switch 167 and a lead 174 is connected to the terminal 169a and hence to $L_2$ thereby normally shorting the rotor coil. However, the print motor lock-in cam 170, being drivably connected to the print motor 164, is angularly shifted by the momentary energization of the relay 163 and by a suitable linkage urges the switch blade 171 upwardly, as viewed in Fig. 1, into engagement with contact 173, which is connected to $L_1$ via a lead 175 in which is interposed a suitable condenser 176. The switch 171 will engage the contact 173 for one revolution of the main drive shaft of the motor 164 and thereafter will return to the position shown in Fig. 1. The switch 167 at that time being closed, the shorting of the rotor coil 169 will provide substantial damping for the print motor 164.

The control coil 165 of the print relay 163 is under the influence of the print switch 162 as follows: One extremity of such coil is directed to $L_2$ and the opposite extremity thereof is connectable to $L_1$ via the switches 162, 147 and 100 connected in series. That is, such opposite extremity of coil 165, by means of a lead 177, is connected to one terminal 162a of the switch 162, the opposite terminal thereof, 162b, being connected to the terminal 146 of the switch 147 via a lead 178. Thus the the circuit (for automatic operation) of the print relay coil 165 is as follows: L₁, lead 150 (in which switch 100 is interposed), switch 147, lead 178, switch 162, lead 177, coil 165, and L₂.

For manual actuation of the print relay 163, the aforementioned finger switch 161 (normally open) is provided, which is connected in parallel to the coil 165 by the following circuit: L₁, lead 179, switch blade 180, contact 181, a lead 182, switch 161, a lead 183, switch 184, lead 185, lead 177, coil 165 and L₂.

The switch blades 118, 180 and 130a are interconnected for joint movement between a "manual" and "automatic" position, the manual position being to the left, as viewed in Fig. 1. In order to indicate whether or not the aforementioned group of switches is in "manual" or "automatic," a lamp is provided at 186 which is connected on one side to L₂ via a lead 187 and on the other side thereof via a lead 188 is connected to a contact 189 (positioned for engaging the switch blade 180) and located opposite to the aforementioned contact 181. That is, the switch blade 180 engages contact 181 when in "manual" and the contact 189 when in "automatic."

The print cam switch 162 is controlled by a print cam 190 which closes such switch 162 at four and one-half seconds of the time control cycle through the end of the fifth second. It is, of course, only necessary to close such switch for a period adequate to ensure the actuation of the locking circuit of the print motor, namely, to ensure that the blade 171 engages the switch contact 173.

As above mentioned, it is desired that the printer not be actuated unless the vehicle is fully and alone on the scale rails for the full scale time of three seconds. This is accomplished by the insertion of the relay switch 100 (of relay 99) in the print relay circuit. Thus should a vehicle move off of the scale rails before the three-second period and thus before the stop indicator cam 149 has a chance to close the contact 157 (via motor 153), the switch 100 will be opened due to actuation of the secondary track circuit and the print relay cannot be energized when the print cam 190 closes the switch 162 at four and one-half seconds. However, should the vehicle be on the scale rails the full three-second period, the switch 147, upon closing, will complete the circuit of the timer motor 153 (via lead 155, lead 143, said switch 147, lead 150 and switch 100), thereby energizing momentarily the motor 153, closing the switch 157 causing the motor circuit to be locked for six seconds, and to move the cam 156 through one revolution thereby holding the switch 157 closed for six seconds. During such six-second period, the print switch 162 when closed can complete the print relay circuit via lead 178, lead 145, lead 143, lead 155, lead 159, switch 157, lead 158 and L₁.

In order to prepare for manual operation of the printer unit, the switch blades 152 and 184 are shifted from the position shown in Fig. 1 to the left into engagement with their respective contacts. This energizes the stop indicator relay 78 thereby stopping the type wheels 37. Thereafter the three switch blades 118, 180 and 130a are jointly shifted to the position shown in Fig. 1, that is, to "manual" thereby moving the blade 180 into engagement with contact 181 and thereby fully preparing the manually operable circuit of the control coil 165 via the switch 161.

I have found it desirable to provide a switch 191 having a blade 191a, the blade of which is interconnected for movement with the switch blades of switches 104 and 120, the switch 191 (designated collectively 192) being connected in parallel with the switch 152. Thus the three switch blades 104, 120 and 191a can be moved together from the position "no weigh," shown in Fig. 1, wherein only the blade of 191a engages its contact, to a "weigh" position wherein the latter is open and the other two switches are closed thereby preparing the stop indicator relay circuit for automatic operation and also the circuit of timer motor 75 (via switch 104) and the circuit of the switches 113, 112 and of timer 153 (via switch 120).

In operation, the triple switch 192 is shifted to its left or "weigh" position, a double switch 193 (switches 152, 184) is shifted to the position shown in Fig. 1, and a triple switch 194 (switches 118, 130 and 184) is moved to "automatic." A master switch 195 on the main power line L₁ is closed and the apparatus is prepared for automatic operation by a vehicle moving upon the scale. It is assumed that all of the wheels of the vehicle are connected together electrically through the structure of the vehicle. When the two front wheels of a vehicle first engage the scale rails 21, 22, both the primary and secondary track circuits are energized, that is, relays 86 and 99 are energized by virtue of: (a) the closing of the circuit between the scale rails, and (b) the closing of the circuit between scale rail 21 and one of the rail members, in this case entrance rail member 92. If the circuit of the timer 75, prior to this instant has been locked in an open condition by the relay 109, as by a previous car, that is, by the locking open of the switch 107, the latter will now instantly close by virtue of the opening of the switch 102 under the influence of the now energized coil 97. However, the timer motor 75 will not start because the circuit thereof is open due to the fact that the switch 101 of the relay 99 is open also due to the energized coil 97. However, the switches 87 and 107 are at this time closed and the timer circuit is prepared for being closed by said switch 101. The latter closes at the instant of the deactuation or deenergization of the relay coil 97 resulting from the movement of the rear wheels of the car off of the entrance rails and onto the scale rails or the movement of the rear wheels of a car ahead off of the scale rails and onto the exit rails (e. g. 94, 95)—whichever occurs last. At such instant the operation of the timer motor 75 is initiated and the several cams 112, 121, 124, 138, 149 and 190 simultaneously commence to shift angularly, in this case clockwise. The timer circuit lock-in cam and switch 112, 113 immediately lock closed the circuit of the timer 75 for a desired time period, for example, five seconds, and simultaneously therewith and for a similar period the lockout relay control switch 122 is closed by the cam 121. Thus the coil 110 of the lockout relay 109 is energized, opening the switch 107 and closing the switch 108. The opening of switch 107 breaks the normal timer circuit and prevents a repetitious cycle of the timer motor 75 should a car go too slow or remain upon the scale rails. This occurs by virtue of the closing of the switch 108, which completes the circuit of the coil 110 and holds open the switch 107 subject to the influence of the switch 102 which in turn will open when the car moves off of the scale or a following car moves thereon. At the expiration of one second, the electrical damping cam and switch 124, 125 actuates the electrical damping relay 127 and connects the electrical damping network 76 across the servomotor control coil 31b. This occurs from the end of the first through the fifth second. At two seconds, the mechanical damping relay 77 is energized via the cam 138 and switch 137 and is maintained energized from the end of the second through the fifth second. At the expiration of the car scale time of three seconds, the stop indicator relay 78 is energized by the closing of the switch 147 by means of the stop indicator cam 149, the switch being held closed from the end of the third second through the fifth second. Assuming that the vehicle is still fully and alone on the scale rails at the expiration of such three-second period, the switch 100 of relay 99 will then be closed and the circuit of the timer motor 153 will be at least momentarily closed for a period sufficient to close the switch 157 which closes the self-locking circuit of such timer for a period of six seconds and thereby provides, as above described, a circuit through which the print relay can be actuated whether or not the vehicle thereafter moves off of the scale rails. Thus, at the expiration of four and one-half seconds of the time control cycle, the print cam 190 can complete the circuit of the print relay 163 and thereby actuate the print motor 164 and the hammer assembly 160. The timer 75 terminates its operation at the expiration of said fifth second and the print cycle expires about one-half second thereafter, namely, at about five and one-half seconds following the initiation of the timer 75.

Since the timer motor 75 will start only at the instant when the secondary circuit is opened, the primary circuit then being closed, such timer will start when the rear wheels of the car ahead of the one to be weighed leaves the scale rails even though such car to be weighed is partially down or upon the scale rails.

*Embodiment of Fig. 2*

In the design of the embodiment of Fig. 1, it is assumed that the front and rear wheels of a vehicle to be weighed are electrically interconnected through the frame of the vehicle. When this is so, the above-described operation of the relay 99 can be depended upon. However, where the frame of the vehicle is, for example, of wooden construction or for some reason such front and rear wheels are not electrically interconnected, the relay 99 will "fall out" or become deenergized after the wheels of the first truck have passed onto the scale rails. Usually each truck is provided with two axles and thus four wheels. Consequently when vehicles having such trucks are being weighed, such relay 99 would become deenergized after the wheels of the second axle have passed onto the scale rails.

The means provided to overcome this difficulty are shown in Figs. 2, 3, and 4, wherein parts similar to those of the first embodiment are referred to by like numbers. Such means comprise primarily: (a) photocell circuit means for holding the relay 99 in a closed condition from the instant when the front pair of wheels move onto the scale rails up to the instant when the rear pair of wheels thereof move thereon; and (b) a second photocell circuit means also for holding the relay 99 in energized condition from the instant when the front wheels of the vehicle leave the scale rails until the instant when the rear wheels thereof also leave such rails. Such photocell circuit means, of course, depend for operation upon the interruption of a light beam by the vehicle being weighed or to be weighed. The first photocell circuit means include the following: A photocell 196 positioned, for example, several feet from the scale rails on one side of the railway opposite a light source 197 positioned on the other side of such railway. The photocell 196 is connected, by suitable means, to a photocell amplifier 198 for amplifying the electrical energy controlled by the photocell. Such amplified electrical energy is directed to the control coil 199 of the relay 200. The actuation of the relay coil 199 is effective to hold in an energized condition the aforedescribed coil 97 of the relay 99 by the following means. A lock-in relay 201 is added to the relay 99 and is provided with a movable contact 201a and a fixed contact 201b. The latter terminal, via a lead 202, is connected to a terminal 203 of the coil 97, the latter terminal in turn being connected to the lead 91 by a lead 91a. The former contact 201a, via a lead 204 is connected to a movable contact 205 of the aforementioned relay 200, the movable contact 205 cooperating with a fixed contact 206 which in turn, via a lead 207, is connected to the lead 80. The latter interconnects the rectifier 82 and the scale rail 21. Thus an approaching car or vehicle interrupts the beam of light from the source 197 thereby operating or actuating the photocell 196 and the photocell amplifier 198. Consequently the relay 200 is energized, closing the normally open contacts 205 and 206. As soon as the first wheel bridges the gap between the entrance rail 92 and the scale rail 21, the control coil 97 will be energized thereby closing the normally open switch 201 and thus automatically locking the circuit of the coil 97 via the now closed contacts 205, 206. The circuit through which such coil is temporarily locked in energized condition is as follows: rectifier 82, lead 83, lead 96, coil 97, lead 92, switch 201, lead 204, contacts 205 and 206, lead 207, lead 80 and thence to said rectifier. The relay coil 97 will remain energized or "locked up" until the relay 200 becomes deenergized, which will thereby separate the contacts 205, 206 which will occur when the car no longer interrupts the light beam from the source 197. It is assumed in this embodiment that the vehicle travels from left to right, as viewed in Figs. 2, 3 and 4.

Referring to Fig. 4, the distance (a) between the left extremity of the scale rails and the point at which the light beam (from source 197) is interrupted is selected so that when the rear (or left end) of the car has progressed to the point where such light beam from 197 again falls on the cell 196, the wheels upon the front and rear axles of the rear truck (including the interconnecting truck structure), straddle the gap at the entrance to the scale rails (or weighbridge). The circuit through the frame of the truck is adequate to maintain energized the coil 97 of the relay 99 until, of course, the rear wheels of the last truck move off of the entrance rail members.

Thus where two axle trucks are used, the first photocell can be positioned to hold coil 97 energized from the instant when the rear wheels of the front truck leave the entrance rails to the instant when the front wheels of the rear truck engage the scale rails.

A second photocell circuit means is provided for ensuring the energization of the coil 97 of the relay 99 from the instant when the front wheels of the car move off of the scale rails and onto the exit rails 94, 95 up until the instant when the wheels on the first axle of the last truck of the vehicle move onto the exit rails. Such second photocell is indicated at 208 and is positioned opposite a second light source 209 between which a vehicle, as at 210 (Fig. 4), can pass. A photocell amplifier 211 is connected to the photocell 208, the amplified energy output of which controls a control coil 212 of the relay 213. The latter is provided with a normally open switch 214 having a fixed contact 214a and a movable contact 214b. The former contact is connected to the lead 207 and the latter to the lead 204. Consequently it is seen that the relay 213 is capable of applying energy to the contact 201a of the switch 201 thereby to permit the locking in of the circuit of the coil 97 via the switch 214 whenever the light beam from the source 209 is interrupted.

Thus the photocell circuits above described make it immaterial whether or not a vehicle being weighed has suitable electrical interconnection between the trucks thereof through the vehicle frame. However, it is assumed in this embodiment that there will always be a suitable electrical interconnection between the wheels of a given truck of a vehicle. However, it is, of course, possible electrically to dissociate the front wheels and the rear wheels of all trucks of a vehicle and to operate the embodiment of Figs. 2 and 3 satisfactorily by suitable positioning of the photocells and their respective light sources.

The wiring diagram shown in Fig. 2 is substantially identical to that shown in Fig. 1, like references of course referring to like parts. However, minor changes have been made in the diagram of Fig. 2, including, for example, the employment of a rectifier 215 in the lead 136 of the mechanical damping relay 134 and also the employment of a condenser 216 connected across the control coil 134 of such relay. Such rectifier introduces a direct current to said coil and the condenser acts as a conventional filter. Also the positions of certain of the switches have been altered in order to simplify the diagram.

Although two embodiments of the invention have been shown and described in detail, the invention is not limited thereto. For example, for so-called "two shot" weighing, that is, the weighing of a car by weighing all its trucks separately on shortened scale rails so that the gross weight of the car is the sum of the two truck weights, the short sections of the entrance and exit rails adjacent such shortened scale rails are also insulated and connected together as is done for the entrance and exit rails of Figs. 1 and 2. Each of these short sections of insulated rails is made longer than the wheel base of the longest two-axle trucks and longer than the distance between the adjacent axles of trucks having three or more axles, but shorter than the distance between the rear axles of the front truck and the front axle of the rear truck. Such length will normally be six to seven feet for practically all freight cars used on railroads in the United States of America.

Also, if desired, the scale rail 21 of the secondary track circuit can be made a few inches longer than the other scale rail at the exit end thereof in order to ensure that the relay 86 is deenergized (thereby opening the timer circuit) before relay 99 is deenergized, thus preventing an unwanted second cycle of the timer 75 as the rear wheels leave the scale rails. Quick-acting relays, of course, can be used, making it unnecessary so to lengthen one of the scale rails relative to the other and even if switch 101 is closed slightly before the opening of switch 87, the time interval is not long enough to close the switch 113 of the timer lock-in cam 112.

There is thus provided a novel apparatus which eliminates the use of switches which are directly operated by vehicle wheels. Also it is unnecessary, in order for proper operation of the apparatus, to count the number of wheels which move on and off the scale rails. Thus there is no necessity for synchronizing devices for counting car wheels, and the novel apparatus functions the same regardless of the number of axles of the vehicles being weighed.

What is claimed is:

1. In apparatus of the class described, weighing means having a scale platform, the latter including a pair of scale rails; a track circuit including said scale rails; another track circuit including at least one of said scale rails and a track member in alignment with a scale rail, each of said track circuits having a normal inherent impedance which is alterable as follows: the first-mentioned track circuit in response to the electrical association of said scale rails via the structure of a vehicle, and the second-mentioned track circuit in response to electrical association of a scale rail in such circuit with such track member also via the structure of such a vehicle; and means for controlling said weighing means in response to a preselected sequence of impedance changes in said track circuits resulting from the movement of a vehicle over said scale rails and said track member.

2. In apparatus for weighing a railway vehicle, a pair of scale rails; a pair of entrance rail members; a pair of exit rail members; weighing means operatively associated with said scale rails for measuring the weight of a vehicle thereupon; a primary track circuit including said scale rails and having a normal inherent impedance which is alterable in response to electrically coupled portions of a railway vehicle electrically coupling both of such scale rails; a secondary track circuit including: at least one of said entrance rail members, at least one of said exit rail members, and at least one of said scale rails, and also having a normal inherent impedance alterable in response to electrical coupling of such a rail member and one of such scale rails via such portions of such a railway vehicle, said primary and secondary circuits each having such normal inherent impedances in the absence of a railway vehicle effecting such coupling; and means for applying a controlling force to said weighing means in response to a preselected sequence of changes of impedance of said track circuits.

3. In apparatus for controlling weighing means for vehicles, such weighing means including indicia means, such apparatus having in combination: a pair of parallel scale track elements operatively connected to such weighing means whereby the latter can measure a weight upon the former; a pair of track members each in alignment with a track element but situated on opposite ends of said pair of elements; a primary circuit actuatable in response to electrical association of said track elements via the structure of a vehicle; a secondary circuit actuatable in response to electrical association of either one of said track elements with a track member via the structure of a vehicle; timer means; means for initiating the operation of said timer means in response to the deactuation of said secondary circuit, said primary circuit then being actuated; means operatively connected to said timer means for applying a braking force to such indicia means a preselected time interval after the initiation of said timer operation; and means, operative in response to actuation of said secondary circuit during said time interval, for suspending operability of said brake force applying means for a preselected period.

4. In apparatus of the class described, a primary track circuit including: a pair of scale track elements; a secondary track circuit including at least one of a pair of entrance track members, at least one of a pair of exit track members and at least one of said scale track elements; weighing means operatively associated with said scale track elements for measuring the weight on said elements; control means for said weighing means for maintaining a weight indication thereof; said primary and secondary circuits having normal inherent impedances in the absence of a vehicle, such normal inherent impedance of said primary circuit being alterable in response to the electrical association of said scale track elements through the structure of a vehicle simultaneously engaging same, the normal inherent impedance of said secondary circuit being alterable in response to the electrical association of the scale track element thereof with one of the track members thereof via the structure of a vehicle; timer means operatively connected to said circuits for measuring a preselected vehicle scale time interval commencing upon the return of the impedance of said secondary circuit from an altered to said normal value, such normal inherent impedance of said primary circuit concurrently being altered; and means for actuating said control means upon the expiration of such scale time interval.

5. In apparatus of the class described for use with a pair of entrance track members, a pair of exit track members, and a pair of scale track elements, the latter being interposed in alignment with and between said entrance and exit track members, the combination therewith of: weighing means operatively associated with said scale track elements for indicating the weight thereupon; control means for said weighing means including: a primary track circuit including said scale track elements and having an impedance which is alterable by electrically coupled portions of a vehicle simultaneously engaging such track elements, a secondary track circuit including at least one of said scale track elements, at least one of said entrance track members and at least one of said exit track members and having an impedance alterable by such portions of such a vehicle resting partially upon such scale track element and simultaneously upon one of such track members, such circuits having normal inherent impedances in the absence of a vehicle, means for measuring a preselected vehicle scale time interval and responsive to concurrent alteration of the impedances of such circuits followed by the return of the impedance of said secondary circuit to such normal inherent impedance, the measurement of such time interval commencing at such return of the impedance of the last-mentioned circuit, control means for said weighing means, means for actuating said control means at the expiration of such vehicle scale time interval, and means for rendering temporarily inoperative for a preselected period said control means in response to a subsequent alteration of the impedance of said secondary circuit during said scale time interval.

6. A railway vehicle scale having in combination: a pair of scale rails; a pair of entrance rail members and a pair of exit rail members; weighing means operatively associated with said scale rails for producing a visual indication of the weight upon such scale rails; a printer unit having indicia means also operatively connected to said weighing means, such indicia means also providing an indication of the weight of such scale rails; and control means for said weighing means and printer unit including: primary track circuit means, including said scale rails, said primary circuit means having a normal inherent impedance which is alterable in response to a railway vehicle engaging and electrically associating through its structure said scale rails, secondary circuit means including at least one of said entrance rail members, at least one of said exit rail members, and at least one of said scale rails, said secondary circuit means also having a normal inherent impedance which is alterable in response to the electrical association of at least one of said rail members in said secondary circuit with at least one of such scale rails in said secondary circuit via the structure of such a railway vehicle, damping means for said weighing means and printer unit, arresting means for said weighing means and printer unit indicia means, and actuator means for said printer unit, timer means for sequentially actuating said damping, arresting and actuator means according to a preselected time schedule and during preselected periods, said arresting means being actuated at the expiration of a preselected vehicle scale time interval, means for initiating the operation of such timer means in response to a preselected change in impedance of said secondary circuit means, the impedance of said primary circuit means being then concurrently altered due to such a vehicle electrically associating such scale rails, and means operable only during such vehicle scale time interval for rendering inoperative said arresting and actuator means in response to a subsequent change in impedance of said secondary circuit means occurring during such scale time interval.

7. In apparatus for weighing a railway vehicle for use with a pair of scale rails, a pair of entrance rail members and a pair of exit rail members, the combination therewith of weighing means operatively associated with said scale rails for measuring the weight of a vehicle thereupon; a primary track circuit including said scale rails and having a normal inherent impedance which is alterable in response to a railway vehicle engaging both of such scale rail members simultaneously, a secondary track circuit including: at least one of said entrance rail members, at least one of said exit rail members, and at least one of said scale rails, and also having a normal inherent impedance alterable in response to engagement of such a rail member and one of such scale rails simultaneously by a railway vehicle, said primary and secondary circuits each having such normal inherent impedances in the absence of a railway vehicle being in such engagement; means for measuring a preselected scale time of a vehicle upon such scale rails, such scale time interval comprising a period during which such vehicle is fully and alone upon such scale rails, and including timer means; control means for applying a controlling force to said weighing means for holding a weight indication thereof; means for initiating the measurement of such scale time interval by said timer in response to the occurrence of a preselected change in the impedance of said secondary circuit as caused by the movement of a railway vehicle fully upon said scale rails or the movement entirely off of at least one of said scale rails of a vehicle ahead of the first-mentioned vehicle, whichever occurs last, the impedance of said primary circuit being concurrently altered due to said first-mentioned vehicle engaging simultaneously said scale rails, said timer means being operatively connected to said control means for actuating same at the expiration of said scale time; and means operable only during such scale time interval for rendering inoperative said control means in response to a subsequent change in impedance of said secondary track circuit occurring during such time interval.

8. A railway vehicle scale having in combination: a pair of scale rails; a pair of entrance rail members and a pair of exit rail members; strain gauge means for supporting said scale rails and for producing an electrical signal responsive in degree to the weight upon said scale rails; signal converting means, including indicia means for converting such signal from said strain gauge means into a weight indication, said signal converting means requiring a preselected scale time interval to reach a predetermined weight indication after a vehicle is fully and alone on such scale rails; a primary circuit, including said scale rails and having a normal inherent impedance which is alterable in response to electrically coupled portions of a railway vehicle electrically coupling such scale rails; a secondary circuit including: at least one of said entrance rail members, at least one of said exit rail members, and at least one of said scale rails, and having a normal inherent impedance alterable by such portions of a railway vehicle electrically coupling such a rail member and such a scale rail, said circuits each having such normal inherent impedances in the absence of a railway vehicle actuating same; brake means for applying a braking force to said weight indicia means a preselected time after the return of said secondary circuit to its normal inherent impedance as caused by the movement of a vehicle on said scale rails out of engagement with said rail members, the impedance of said primary circuit being concurrently altered due to said vehicle electrically coupling said scale rails, such last-mentioned time being not less than said scale time interval; and means actuatable by a subsequent preselected alteration of the impedance of said secondary circuit during said scale time for rendering inoperative said brake means.

9. In apparatus for weighing a railway vehicle, a pair of entrance rail members; a pair of exit rail members; scale rails interposed between said entrance and exit rail members; weight responsive means operatively connected to said scale rails for measuring the weight thereupon; a primary circuit including said scale rails and actuatable in response to electrically coupled portions of a railway vehicle resting upon said scale rails; a secondary circuit including: at least one of said entrance rail members, at least one of said exit rail members, and at least one of said scale rails, such secondary circuit being actuatable in response to such portions of a railway vehicle interconnecting such a rail member to such a scale rail, said weight responsive means requiring a preselected minimum vehicle scale time for coming up to vehicle weight; weight printer means having indicia means; means for controlling said indicia means in response to said weight responsive means; a timer having means operatively connected thereto for arresting said indicia means and thereafter actuating said printer; electrical means for actuating said timer in response to deactuation of said secondary circuit, said primary circuit being concurrently actuated; and means responsive thereafter to the actuation of said secondary circuit prior to the actuation of said arresting means for rendering inoperative said printer means.

10. In apparatus for weighing a railway vehicle having the axles and wheels thereof electrically connected, including, in combination: a pair of scale rails positioned side-by-side in spaced relation; a pair of entrance rail members and a pair of exit rails members in alignment with and adjacent to said scale rails at opposite extremities of the latter; a scale platform circuit including said scale rails and actuatable in response to such a vehicle moving onto such scale rails and altering the impedance of such circuit; a rail member circuit including: at least one of said scale rails, at least one of said entrance rail members, and at least one of said exit rail members, said rail member circuits being actuatable in response to portions of such a vehicle concurrently engaging at least one of said scale rails and at least one of said rail members of said rail member circuit thereby altering the impedance of such circuit; weighing means operatively connected to said scale rails and responsive to the weight upon the latter; a weight digital printer having indicia elements; means for operatively interconnecting said indicia elements to said weighing means, said weighing means requiring a car to be fully on said scale a preselected scale time interval to reach a weight indication; a timer having means operatively connected thereto for sequentially damping said weighing means, arresting same and thereafter initiating the operation of said weight digital printer; means for initiating operation of said timer for measuring such scale time interval commencing with the deactuation of said rail member circuit, said scale platform circuit being concurrently actuated; said means for damping and locking said weighing means being operable seriatim and within said scale time interval; and means responsive to the actuation of said rail member circuit during said scale time interval for rendering inoperative said weight digital printer.

11. Apparatus for weighing a railway car having in combination: a scale platform, including a pair of scale rails, force sensitive means operatively associated with said scale platform for producing a signal in response to the weight upon such rails; indicia means operatively connected to said force sensitive means for indicating the weight upon said scale rails in response to a signal from said force sensitive means; an entrance rail member and an exit rail member each in alignment with and adjacent to a scale rail respectively at the entrance and exit of said scale rails; a scale platform circuit including said scale rails actuatable in response to a car moving onto such rails and altering the impedance of such scale platform circuit via the structure of such car; a rail member circuit including at least one of said scale rails and at least one of said rail members and actuatable in response to electrically interconnected portions of the structure of a car concurrently engaging at least one of such scale rails and at least one of said rail members thereby to alter the impedance of such rail member circuit; a timer; means for initiating the operation of such timer in response to the alteration of the impedance of said rail member circuit due to the deactuation of said rail member circuit, said scale rail circuit being concurrently actuated; damping means for said indicia means operatively connected to said timer and operable a first time interval after the initiation of the operation of said timer; means operable thereafter for arresting the movement of said indicia means, said arresting means being operable a second preselected time interval after the starting of said timer; and means effective only during said second time interval for rendering inoperative said indicia arresting means in response to the actuation of said rail member circuit.

12. Apparatus for weighing a railway car having in combination: a scale platform, including a pair of scale rails, force sensitive means operatively associated with said scale for producing a signal in response to the weight upon such rails; indicia means operatively connected to said force sensitive means for indicating the weight upon said scale rails in response to a signal from said force sensitive means; an entrance rail member and an exit rail member each in alignment with and adjacent to a scale rail respectively at the entrance and exit of said scale rails; a scale platform circuit including said scale rails and actuatable in response to a car moving onto such rails and altering the impedance of such scale platform circuit via the structure of such car; a rail member circuit including at least one of said scale rails and at least one of said rail members and actuatable in response to the structure of a car concurrently engaging at least one of such scale rails and at least one of said rail members thereby to alter the impedance of such rail member circuit; means for arresting said indicia means a preselected time interval after the instant of the deactuation of said rail member circuit due to the movement of a car off of said entrance or exit rails, a car then being fully and alone on said scale rails, said scale platform circuit concurrently being actuated; and control means for rendering inoperative said arresting means in response to a subsequent actuation of said rail member circuit but prior to the expiration of said preselected time interval.

13. In apparatus for weighing a railway car, a scale platform including a pair of side-by-side parallel scale rails; a pair of entrance rail members and a pair of exit rail members in alignment with and adjacent to said scale rails at opposite extremities of the latter; a scale platform circuit including said scale rails and actuatable in response to a car moving onto such scale rails and altering the impedance of such scale platform circuit via the structure of such a car; a rail member circuit including at least one of said scale rails and at least one of said rail members and actuatable in response to the structure of a car concurrently engaging at least one of such scale rails and at least one of such rail members thereby to alter the impedance of such rail member circuit; force sensitive means operatively connected to such scale rails for producing a signal responsive to the weight upon such rails; indicia means for said weight; means operatively interconnecting said force sensitive means and said indicia means for actuating the latter in response to a signal from the former, means for arresting said indicia means upon the expiration of a preselected time interval as measured from the instant of the deactuation of said rail member circuit, said scale platform circuit concurrently being actuated; and means for rendering inoperative said arresting means in response to actuation of said rail member circuit during such time interval.

14. In apparatus for weighing a railway vehicle, a scale platform including a pair of parallel scale rails; an entrance rail member in alignment with one of said scale rails; an exit rail member in alignment with one of said scale rails; a scale rail circuit, including said scale rails, the impedance of which circuit is alterable via the structure of a railway vehicle electrically coupling such rails; a rail member circuit, including said rail members and at least one of said scale rails, the impedance of which circuit is alterable via the structure of such a railway vehicle electrically coupling one of such rail members and such scale rail; force sensitive means operatively connected to said scale rails for producing a signal responsive to the weight upon such scale rails; indicia means operatively connected to such force sensitive means and responsive to such signal; means for measuring a preselected time interval commencing in response to a change of said rail member circuit impedance during the period when the impedance of said scale rail circuit is in an altered condition; means operatively connected to said timer for arresting such indicia means at the expiration of such time interval; and means operable thereafter, during the measurement of such time interval, for rendering inoperative such arresting means in response to any further alteration of the impedance of such rail member circuit by any vehicle electrically coupling one of said rail members and at least one of said scale rails.

15. In apparatus for weighing a railway vehicle, a scale platform including a pair of parallel scale rails; an entrance rail member in alignment with one of said scale rails; an exit rail member in alignment with one of said scale rails; a scale rail circuit, including said scale rails, the impedance of which circuit is alterable via the structure of such a railway vehicle electrically coupling such rails; a rail member circuit, including said rail members and at least one of said scale rails, the impedance of which circuit is alterable via the structure of such a railway vehicle electrically coupling one of such rail members and such scale rail; force sensitive means operatively connected to said scale rails for producing a signal responsive to the weight upon such scale rails; indicia means operatively connected to such force sensitive means and responsive to such signal; means for measuring a preselected time interval commencing in response to a change of said rail member circuit impedance during the period when the impedance of said scale rail circuit is in an altered condition; means operatively connected to said timer for arresting such indicia means at the expiration of such time interval; means operable during such time interval first for damping said indicia means and thereafter for arresting said indicia means; and means operable after initiation of the measurement of such time interval and before its expiration, and in response to any further alteration of the impedance of said rail member circuit by any vehicle electrically coupling one of said rail members and at best one of said scale rails, for rendering inoperative said arresting means.

16. In apparatus for weighing a railway vehicle, a scale platform including a pair of parallel scale rails; an entrance rail member in alignment with one of said scale rails; an exit rail member in alignment with one of said scale rails; a scale rail circuit, including said scale rails, the impedance of which circuit is alterable by the structure of such a railway vehicle electrically coupling such rails; a rail member circuit, including said rail members and at least one of said scale rails, the impedance of which circuit is alterable by the structure of such a railway vehicle electrically coupling one of such rail members and such scale rail; force sensitive means operatively connected to said scale rails for producing a signal responsive to the weight upon such scale rails; a printer unit having indicia means operatively connected to said force sensitive means and responsive to such signal; means for measuring a preselected time interval commencing in response to a change of impedance of said rail member circuit during the period when the impedance of said scale rail circuit is in an altered condition; and means operable only during the measurement of such time interval for rendering inoperative said printer unit in response to any further alteration of the impedance of said rail member circuit by any vehicle electrically coupling one of said rail members and at least one of said scale rails.

17. In apparatus for the weighing of a railway vehicle, a primary track circuit, including a pair of spaced side-by-side scale rails, the impedance of which circuit is alterable from a normal inherent value in response to electrical interconnection of such scale rails via the structure of such a vehicle electrically coupling such rails; a secondary circuit including at least one of such scale rails and a pair of rail members, each of the latter being in alignment with a scale rail but such rail members being situated at opposite extremities of the scale rails, the impedance of such secondary track circuit being alterable in response to an electrical interconnection between the scale rail of said secondary track circuit and at least one of said rail members via the structure of such a vehicle; weighing means operatively interconnectable to said scale rails for measuring weight thereupon; means for operatively interconnecting said weighing means with said scale rails a preselected time following the instant of deactuation of said secondary circuit, said primary circuit concurrently being actuated; and photocell circuit means, including a photocell and a light source element positioned for light beam interruption by a vehicle moving on rails leading to such scale rails, for holding in an actuated condition said secondary circuit during the period of interruption of such light beam from said source by such railway vehicle.

18. In apparatus for the weighing of a railway vehicle, a primary track circuit, including a pair of spaced side-by-side scale rails, the impedance of which circuit is alterable from a normal inherent value in response to electrical interconnection of such scale rails via the structure of such a vehicle engaging such rails; a secondary circuit including at least one of such scale rails and a pair of rail members, each of the latter being in alignment with a scale rail but such rail members being situated at opposite extremities of the scale rails, the impedance of such secondary track circuit being alterable in response to an electrical interconnection between the scale rail of said secondary track circuit and at least one of said rail members via the structure of such a vehicle engaging same; weighing means operatively connected to said scale rails for measuring weight thereupon; means for controlling such weighing means; means for actuating said control means a preselected time following the instant of deactuation of said secondary circuit, said primary circuit concurrently being actuated; photocell circuit means, including a photocell and a light source positioned for interruption of its light beam by such a vehicle moving on rails leading to such scale rails for holding in an actuated condition such secondary circuit during the period of interruption of such light beam from said source by such railway vehicle; and a second photocell circuit means having a light source and a photocell situated near the exit of said scale rails for holding in an actuated condition said secondary circuit during the interruption by such vehicle of a light beam from said source.

19. In apparatus for weighing a railway vehicle, including in combination a pair of scale rails, an entrance rail member, means operatively associated with said scale rails for measuring the weight of a vehicle thereupon; a track circuit including said scale rails and having a normal inherent impedance which is alterable in response to electrically coupled portions of such a railway vehicle electrically coupling both of such scale rails; another track circuit including said rail member and at least one of said scale rails and also having a normal inherent impedance alterable in response to electrically coupling of such rail member and such scale rail by electrically coupled portions of such a railway vehicle, said circuits each having such normal inherent impedances in the absence of a railway vehicle; and means for applying a controlling force to said weighing means in response to a preselected sequence of changes of impedance of said track circuits.

20. In apparatus for weighing a railway vehicle, including in combination a pair of scale rails, an exit rail member, means operatively associated with said scale rails for measuring the weight of a vehicle thereupon; a track circuit including said scale rails and having a normal inherent impedance which is alterable in response to the structure of such a railway vehicle electrically coupling both of such scale rails; another track circuit including said rail member and at least one of said scale rails and also having a normal inherent impedance alterable in response to the electrical coupling of such rail member and such scale rail via the structure of such a railway vehicle, said circuits each having such normal inherent impedances in the absence of a railway vehicle, and means for applying a controlling force to said weighing means in response to a preselected sequence of changes of impedance of said track circuits.

References Cited in the file of this patent

UNITED STATES PATENTS

| Number | Name | Date |
|---|---|---|
| 317,432 | Amet | May 5, 1885 |
| 1,581,771 | Wiley | Apr. 20, 1926 |
| 2,083,783 | Haegele | June 15, 1937 |
| 2,133,760 | Williams | Oct. 18, 1938 |